(12) United States Patent
Patton et al.

(10) Patent No.: US 12,390,046 B2
(45) Date of Patent: Aug. 19, 2025

(54) SYSTEMS AND METHODS FOR ACHIEVING A USER-SPECIFIED TEMPERATURE PROFILE IN A COOKING APPLIANCE THROUGH HEATING CONTROL ALGORITHMS

(71) Applicant: Samsung Electronics Company, Ltd., Gyeonggi-do (KR)

(72) Inventors: Brian R. Patton, San Francisco, CA (US); Santiago Ortega Avila, Milpitas, CA (US); Perdo Martinez Lopez, Mountain View, CA (US); Jacob A. Marks, Stanford, CA (US); Ian David Parker, Santa Barbara, CA (US); Catherine S. Kim, San Jose, CA (US); Sergio Perdices-Gonzalez, Sunnyvale, CA (US); Sajid Hassan Sadi, San Jose, CA (US)

(73) Assignee: Samsung Electronics Company, Ltd., Suwon-si (KR)

( * ) Notice: Subject to any disclaimer, the term of this patent is extended or adjusted under 35 U.S.C. 154(b) by 680 days.

(21) Appl. No.: 17/707,561

(22) Filed: Mar. 29, 2022

(65) Prior Publication Data

US 2023/0309741 A1  Oct. 5, 2023

(51) Int. Cl.
*A47J 36/32* (2006.01)
*A47J 36/24* (2006.01)
*F24C 7/08* (2006.01)

(52) U.S. Cl.
CPC .......... *A47J 36/32* (2013.01); *A47J 36/2483* (2013.01); *F24C 7/082* (2013.01); *F24C 7/087* (2013.01)

(58) Field of Classification Search
CPC . F24C 7/087; F24C 7/082; A47J 36/32; A47J 36/2483; H05B 6/6447
See application file for complete search history.

(56) References Cited

U.S. PATENT DOCUMENTS 9,414,444 B2  8/2016 Libman
9,807,823 B2  10/2017 Einziger
(Continued)

FOREIGN PATENT DOCUMENTS

CN  106664753  5/2017
CN  109727657  1/2019
(Continued)

OTHER PUBLICATIONS

Heat Map Microwave—a New invention; Mark Rober https://youtu_be/ptkzzNaZbZU, Feb. 11, 2015.
(Continued)

*Primary Examiner* — Thien S Tran

(57) ABSTRACT

In one embodiment, a method includes, by an electromagnetic device, accessing multiple previously recorded heating maps corresponding to a load disposed inside a cavity, where each heating map indicates a temperature profile change of the load as a function of one or more control parameter configurations, accessing a target temperature profile of the load, measuring a current temperature profile of the load, calculating a difference in temperature profiles between the current temperature profile of the load and the target temperature profile of the load, determining a first sequence of control parameter configurations to heat the load, wherein the first sequence is optimized to yield a temperature rise that achieves the target temperature profile of the load, emitting electromagnetic radiation into the cavity based on the first sequence of control parameter configurations.

30 Claims, 15 Drawing Sheets

(56) References Cited

U.S. PATENT DOCUMENTS

| | | |
|---|---|---|
| 10,223,933 B1 | 3/2019 | Cheng |
| 10,268,919 B1 | 4/2019 | Piekniewski |
| 10,819,905 B1 | 10/2020 | Liu |
| 11,774,105 B2 | 10/2023 | Chase |
| 2009/0321427 A1 | 12/2009 | Hyde |
| 2009/0321428 A1 | 12/2009 | Hyde |
| 2010/0187224 A1 | 7/2010 | Hyde |
| 2013/0269539 A1 | 10/2013 | Polt |
| 2013/0306627 A1* | 11/2013 | Libman .................. H05B 6/687 219/709 |
| 2015/0289324 A1 | 10/2015 | Rober |
| 2015/0366219 A1 | 12/2015 | Wersborg |
| 2016/0029441 A1 | 1/2016 | Taylor |
| 2016/0073453 A1 | 3/2016 | Hyde |
| 2016/0192446 A1 | 6/2016 | Seddik |
| 2016/0309548 A1 | 10/2016 | Libman |
| 2017/0074522 A1 | 3/2017 | Cheng |
| 2019/0116634 A1 | 4/2019 | Eadan |
| 2019/0254127 A1 | 8/2019 | Ma |
| 2019/0320507 A1 | 10/2019 | Guatta |
| 2020/0187709 A1 | 6/2020 | Ayre |
| 2020/0367692 A1 | 11/2020 | Stipe |
| 2021/0145212 A1* | 5/2021 | Wang .................... A47J 36/321 |
| 2021/0267027 A1 | 8/2021 | Uno |
| 2021/0307135 A1 | 9/2021 | Hooker |
| 2021/0385917 A1* | 12/2021 | Kuchler ................. H05B 6/725 |
| 2021/0386239 A1 | 12/2021 | Eiter |
| 2022/0141928 A1 | 5/2022 | Hong |
| 2022/0264709 A1* | 8/2022 | Zoellner .................. A23L 5/15 |
| 2023/0269840 A1 | 8/2023 | Martinez Lopez |

FOREIGN PATENT DOCUMENTS

| | | |
|---|---|---|
| CN | 110298902 A | 10/2019 |
| JP | H06229557 | 8/1994 |
| JP | 2001201057 A | 7/2001 |
| JP | 2001317742 A | 11/2001 |
| JP | 2004095501 A | 3/2004 |
| JP | 3672767 B2 | 7/2005 |
| JP | 2005315487 | 11/2005 |
| JP | 3792495 | 4/2006 |
| JP | 2015220189 | 12/2015 |
| JP | 2016-110750 A | 6/2016 |
| JP | 2019070462 | 5/2019 |
| KR | 19990065353 A | 8/1999 |
| KR | 10-0416286 B1 | 1/2004 |
| KR | 2019-0069624 A | 6/2019 |
| KR | 2021-0029722 A | 3/2021 |

OTHER PUBLICATIONS

PCT Search Report and Written Opinion in Application No. PCT/KR2022/006554, Aug. 10, 2022.
Combustion Inc. Predictive Probe: https://combustion.inc/, 17 pages, pulled from website Feb. 10, 2022.
Khan, Tareq, "An Intelligent Microwave Oven with Thermal Imaging and Temperature Recommendation Using Deep Learning," Applied System Innovation, Mar. 13, 2020, doi: 10.3390/asi3010013, Accepted Feb. 13, 2020, Published: Feb. 17, 2020, www.mdpi.com/journal/asi, 17 pages.
PCT Search Report and Written Opinion in PCT/KR2023/095007, Jun. 14, 2023.
Non-final office action in U.S. Appl. No. 17/680,104, Dec. 5, 2024.
Non-Final Office Action in U.S. Appl. No. 17/316,497, Jun. 29, 2023.
"Miele adds electromagnetic waves to Wi-Fi oven for better cooking", by Ashlee Clark Thompson; https://www.cnet.com/reviews/miele-dialog-oven-preview/, Aug. 30, 2017.
"What is RF cooking?", Goji Food Solution; http://www.gojifoodsolutions.com/rf-cooking-technology, 2021.
"Put some swagger on your countertop and let June do the cooking." june; https://juneoven.com/pages/smart-oven, 2021.
"NNLC: Non-Negative Least Chi-square minimization and application to HPGe detectors," by Pierre D'esesquelles et al.; Cornell University, Journey Ref: J.Phys.G36:037001,Feb. 22, 2009.
"Software-Defined Cooking using a Microwave Oven", by Haojian Jin et al.; Cernegie Mellon University, Pittsburgh, PA, US, 2019.
"Solving Least Squares Problems," by Charles L. Lawson et al, Society for Industrial and Applied Mathematics, Philadelphia. Chapter 23 pp. 158-173, 1995.
Non-final Office Action in U.S. Appl. No. 17/316,497, Sep. 6, 2024.
Final Office Action in U.S. Appl. No. 17/316,497, Mar. 21, 2024.
European Patent Office Extended European Search Report in application No. 23760451.7-1002 / 4388821 PCT/KR2023095007, Nov. 8, 2024.
Final Office Action in U.S. Appl. No. 17/316,497, Jan. 16, 2025.
Final office action in U.S. Appl. No. 17/680,104, Dated May 6, 2025.
Notice of Allowance in U.S. Appl. No. 17/316,497, Dated May 23, 2025

* cited by examiner

SYSTEMS AND METHODS FOR ACHIEVING A USER-SPECIFIED TEMPERATURE PROFILE IN A COOKING APPLIANCE THROUGH HEATING CONTROL ALGORITHMS

TECHNICAL FIELD

This disclosure relates generally to cooking appliances, and more particularly to user-specified temperature profile control of microwave ovens and other cooking devices.

BACKGROUND

Conventional cooking appliances typically heat food unevenly, often resulting in unsatisfactory food quality (e.g., regions either too hot or too cold), excessive user intervention (e.g., cycling the heat source on and off, and/or moving or rotating the food), potential degradation of the food being heated, minor accidents (e.g., unwanted boiling or spattering due to overheating), slow heating times, and so forth. Additionally, many conventional microwave ovens require the user to input a user-specified heating time duration in order to achieve a desired food temperature. Such a process may be fraught with uncertainty and may often be made more complex for users due to the cumbersome user interface options for entering the heating time durations. It may be thus useful to provide techniques to improve microwave oven devices.

DESCRIPTION OF EXAMPLE EMBODIMENTS

Figure 1:
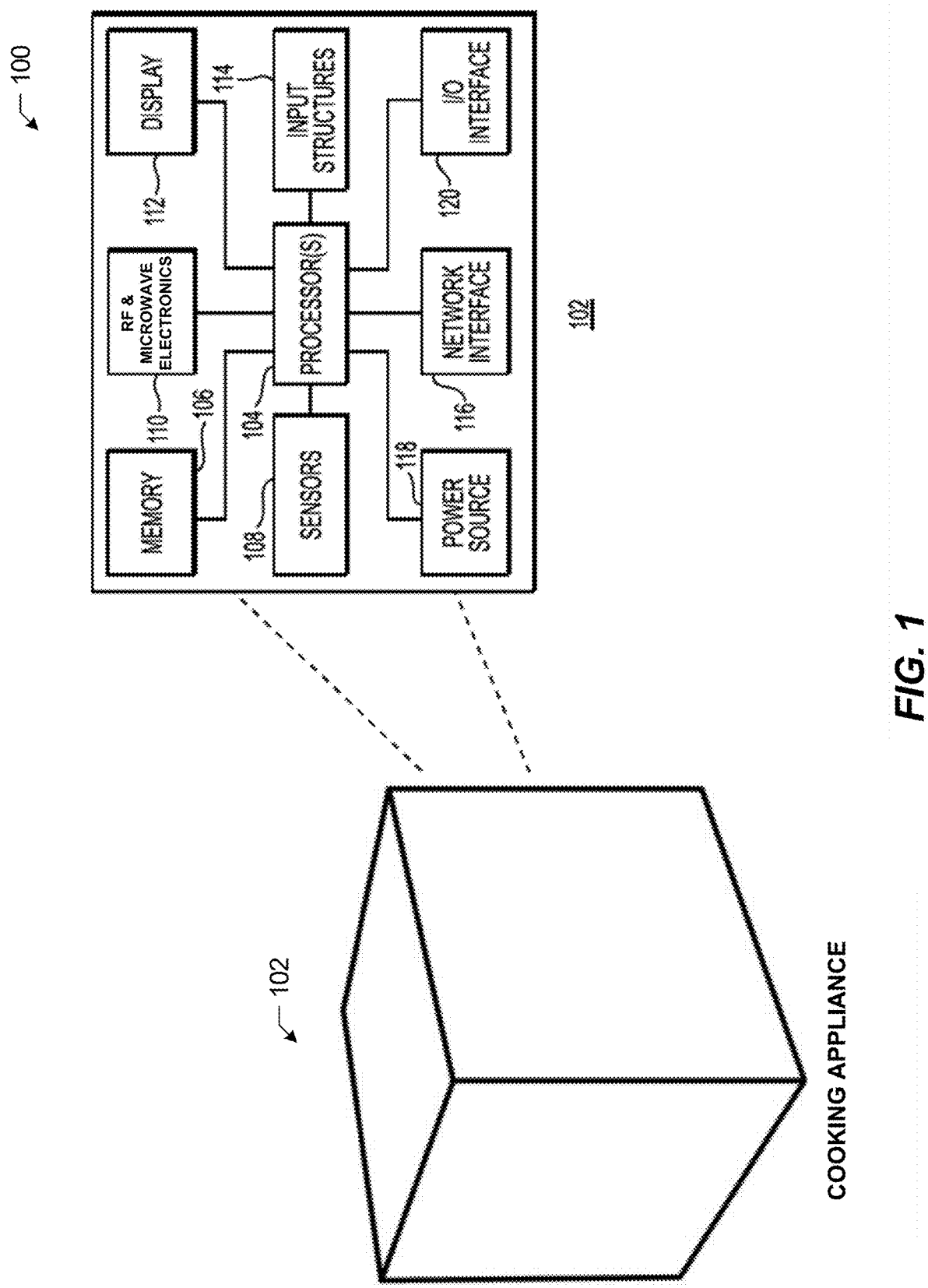
FIG. 1 illustrates an example diagram of a cooking appliance.

FIG. 1 illustrates an example diagram 100 of a cooking appliance 102. In particular embodiments, cooking appliance 102 may include a temperature profile-based electromagnetic cooking appliance 102. In particular embodiments, a cooking appliance 102 may measure the pattern of electromagnetic energy absorbed by a load disposed inside a cavity when electromagnetic radiation is directed into the cavity. As used herein, "cavity" may be defined as an area in which food may cook within a cooking appliance 102. As an example and not by way of limitation, toasting slots within a toaster to cook toast may be defined as a cavity. As another example and not by way of limitation, the cooking chamber within a microwave oven may be defined as a cavity. In particular embodiments, the cooking appliance 102 may include, for example, any of various cooking appliances 102 that may be suitable for heating or warming food, or otherwise directing electromagnetic energy to one or more loads disposed inside a cavity of the cooking appliance 102. In particular embodiments, as further depicted by FIG. 1, the cooking appliance 102 may include, among other things, one or more processor(s) 104, memory 106, sensors 108, radio frequency (RF) and microwave electronics 110, a display panel 112, input structures 114, network interfaces 116, a power source 118, and an input/output (I/O) interface 120. It should be noted that FIG. 1 is merely one example of a particular implementation and is intended to illustrate the types of components that may be included as part of the cooking appliance 102.

In particular embodiments, the one or more processor(s) 104 may be operably coupled with the memory 106 to perform various algorithms for providing a temperature profile-based cooking appliance. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the cooking appliance 102 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect the physical state of the load (e.g., its temperature profile) or various user inputs (e.g., user voice inputs, user gesture inputs, user touch inputs, user instrument inputs, user motion inputs, and so forth). The RF and microwave electronics 110 may include, for example, any number of magnetrons, power amplifiers, signal generators, waveguides, antennas, integrated circuits, transistors, solid-state amplifiers, and/or one or more other devices that may be collectively suitable for directing electromagnetic energy (e.g., microwave energy) to a load (e.g., food, solids, liquids, and so forth) that may be disposed inside a cavity of the cooking appliance 102. The display panel 112 may include any display architecture (e.g., AMLCD, AMOLED, micro-LED, and so forth), which may provide further means by which users may interact and engage with the cooking appliance 102.

In particular embodiments, the input structures 114 may include any physical structures utilized to control one or more global functions of the cooking appliance 102 (e.g., pressing a button to power "ON" or power "OFF" the cooking appliance 102). The network interface 116 may include, for example, any number of network interfaces suitable for allowing the cooking appliance 102 to access and receive data over one or more cloud-based networks (e.g., a cloud-based service that may service hundreds or thousands of the cooking appliance 102 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the cooking appliance 102 for operation. Similarly, the I/O interface 120 may be provided to allow the cooking appliance 102 to interface with various other electronic or computing devices, such as one or more auxiliary electronic devices.

Inhomogeneous heating is an intrinsic property of the cavity of an electromagnetic device (e.g., cooking appliance 102) due to the standing-wave pattern that is established by the reflective walls. Within a source-free medium such as air or food, the RF radiation obeys the electromagnetic wave equation:

$$\nabla \times \left(\frac{1}{\mu}\right) \nabla \times E - \omega^2 \epsilon E = 0 \quad \text{(Equation 1)}$$

$$\nabla^2 E + \omega^2 \epsilon \mu E = 0 \quad \text{(Equation 2)}$$

In Equation 1 and Equation 2, E represents the complex vector electric field, μ represents the complex magnetic permeability of the material, ∈ represents the complex dielectric permittivity of the material, and ω represents the angular frequency of the wave. Incident RF radiation may reflect off the electrically conducting oven walls, setting up a stationary standing wave pattern of constructive and destructive interference. Certain commercial cooking appliances 102 may operate with frequencies of 2400 megahertz (MHz) to 2500 MHz, resulting in a wavelength of 12 centimeters (cm). An empty commercial cooking appliance will tend to have a semi-regular pattern of standing wave nodes and anti-nodes separated by approximately half this length, or 6 cm. The RF wavelength may be smaller in dielectric materials, such as food. For example, food is heated by absorption of the electric field according to its electric and magnetic properties:

$$\epsilon = \epsilon_0(\epsilon' + i\epsilon'') \quad \text{(Equation 3)}$$

In Equation 3, $\epsilon'$ and $\epsilon''$ are real-valued (and generally frequency-dependent) parameters of the food, $\epsilon_0$ is a fundamental physical constant, and $i$ is the imaginary unit. In the absence of magnetic dissipation, the power density P absorbed by the food may be calculated as:

$$P = \frac{1}{2}(\sigma + \epsilon_0 \epsilon'' \omega)|E|^2 \quad \text{(Equation 4)}$$

In Equation 4, σ is the electrical conductivity. In Equation 4, P is measured in watts per cubic meter. The power deposition in the food is proportional to the squared magnitude of the electric field, which is fundamentally inhomogeneous within the cavity due to the standing-wave pattern. In particular embodiments, inhomogeneity is made worse by the fact that the food fundamentally changes the standing-wave pattern within the cavity, meaning that the heating pattern may generally not be determined a priori. The standing-wave pattern is affected not only by the food dielectric characteristics, but also by its geometry and placement within the cavity. For example, if the load is placed on a rotating turntable within the cavity, the standing-wave pattern throughout the cavity will be modulated as the turntable rotates, and regions of high heating within the food will not remain fixed with respect to either the food or the cavity coordinate system. As the inherent standing wave pattern cannot be predicted beforehand due to being strongly influenced by the food, any closed-loop control of the food requires active measurements of where the heat is being deposited.

Inhomogeneous heating is also challenging with infrared (IR) radiant heating, used in broiling and toasting applications. The rate at which a food item heats not only depends on the placement and power of the radiant emitters within an appliance; it also depends on the infrared absorption coefficient of the food's surface, which may vary within the food itself. Further, evaporative cooling may strongly affect the surface heating rate of the load, and may also vary throughout the food due to inhomogeneity of the water content. Even with a multi-emitter system with independent control of each emitter's power, it may not be possible to achieve a controlled final temperature profile without some measurement of the spatially varying absorption rate within the food. The present embodiment is directed to techniques of deterministically modifying the heating patterns within a cooking appliance 102 to achieve a user's desired final temperature profile (e.g., homogenous or non-homogenous temperature profile) for the food placed in the cooking appliance 102. In this way, regardless of the heating mechanism, if the system has knowledge about which heating patterns may be generated by different control parameter configurations of the cooking appliance 102, the system may generate the user's desired temperature profile by open-loop and/or closed-loop control of cycling through one or more sequences of the control parameter configurations. Thus, it may be useful to provide a heating control algorithm to deterministically modify heating patterns.

In particular embodiments, in cooking appliances 102, the microwave energy may be generated by a magnetron (e.g., an analog high-power vacuum tube device that emits radiofrequency waves by resonant oscillation). Though efficient and inexpensive, magnetrons generally have poor frequency and phase control and may not be driven at intermediate powers. The standard approach to power regulation in a commercial cooking appliance is to cycle the magnetron power on and off with variable duty cycle. This relies on thermal diffusion within the food to even out the temperature but may be an imprecise and slow technique that invariably results in overheating or underheating some regions within the load (e.g., food). The conductive heat diffusion equation within a substance is parameterized by its density ρ, specific heat $c_p$, and thermal conductivity k:

$$\rho c_p \frac{\partial T}{\partial t} = k \nabla^2 T \quad \text{(Equation 5)}$$

This diffusion equation (e.g., Equation 5) relates the time derivative of the temperature at every point in the load to its Laplacian (derived from its spatial gradient). The combination $k/\rho c_p$ is the thermal diffusivity $\alpha$ of the substance, with units cm²/sec. The characteristic time $t_{diff}$ for heat to diffuse a length $\ell$ through the material is simplified as:

$$t_{diff} = \ell^2 / 2\alpha \tag{Equation 6}$$

In particular embodiments, the thermal diffusivity of beef is reported in the literature to be $\alpha_{beef} \approx 0.0013$ cm²/s. If two regions within a plate of beef are separated by 1 cm and heated to different temperatures, it may be deduced that it will take approximately 385 seconds for the temperature to even out substantially. Thus, heat diffusion may be too slow to even out hotspots or cold spots. For example, as previously determined through a power-cycled microwave heating experiment, the temperature of the food at the hot spot heats up dramatically when the emitter power is turned "ON", and then slowly falls while the emitter is "OFF". The temperature of the food at the cold spot is very slow to equilibrate.

In particular embodiments, cooking appliance 102 may have the ability to heat specific zones differently by controlling the power of individual heating control elements 530 placed throughout the cooking appliance 102. In principle, this may allow the user to specify a desired final temperature profile for the food placed in the cooking appliance 102, however, fully automated control may be difficult to achieve unless the cooking appliance 102 has knowledge of the spatial heating patterns associated with control parameters. This in turn requires spatial thermometry, which may be most critical when the heating patterns are non-uniform and difficult to predict in advance. Spatial thermometry may be most effective when a change in control parameters results in an immediate change in the heating pattern. These conditions may be met, for example, by radiofrequency (RF) cooking methods as well as broiling and toasting devices. The latter two cooking methods rely on heat via infrared radiation emitted by a set of elements and absorbed by the food's surface. However, inhomogeneities in the broiling and toasting process may arise from the uneven placement of heating elements, poorly controlled thermal losses from the appliance, variation in the food's color, variations in the food's water content, etc. RF cooking is fundamentally inhomogeneous within an enclosed cavity of the cooking appliance 102 due to the standing-wave pattern, and the electric field may not be predicted a priori because the electric field is strongly dependent on the shape, distribution, and dielectric properties of the object being heated. Without knowledge of where heat is being deposited within a food, predicting or controlling a final temperature of the food is generally not possible. Thus, it may be useful to provide intelligent heating algorithms to automatically adjust system control parameters to achieve a target temperature profile without further user interaction.

Figure 2A:
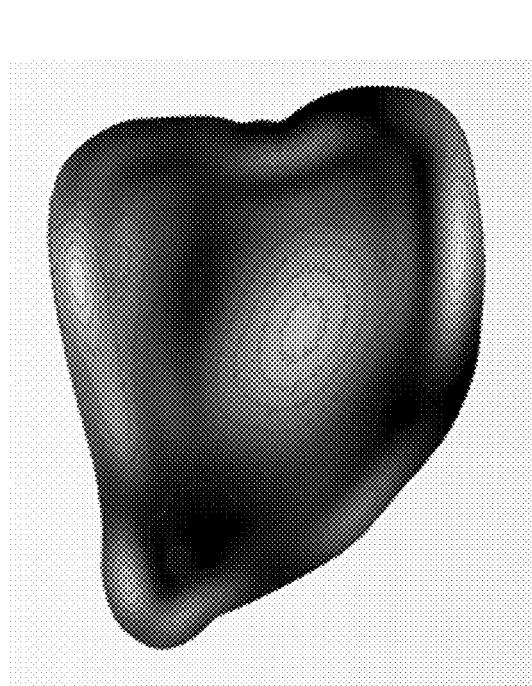
FIGS. 2A, 2B, 2C, and 2D illustrate example diagram of a heating pattern within food being heated by absorption of RF energy in a microwave oven device.
Figure 2B:
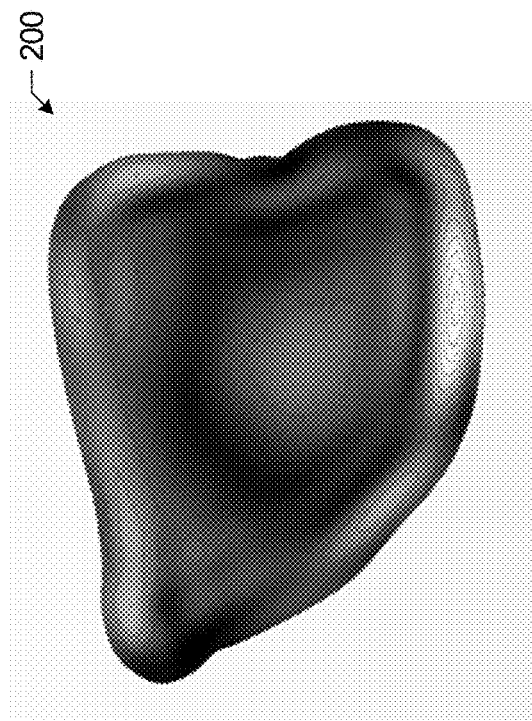
Figure 2C:
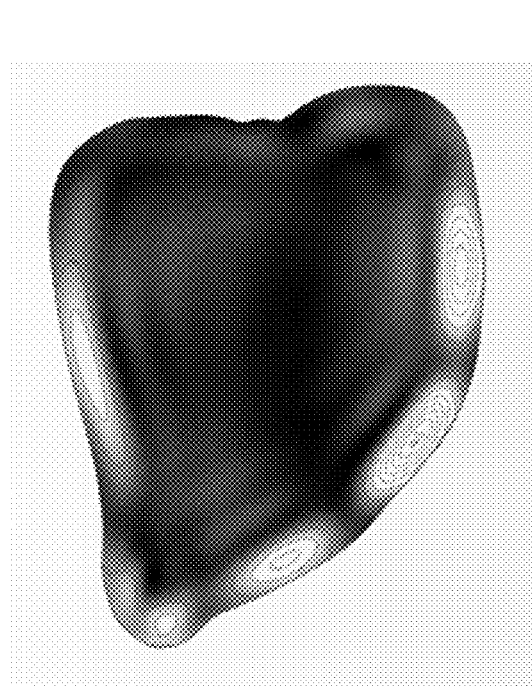
Figure 2D:
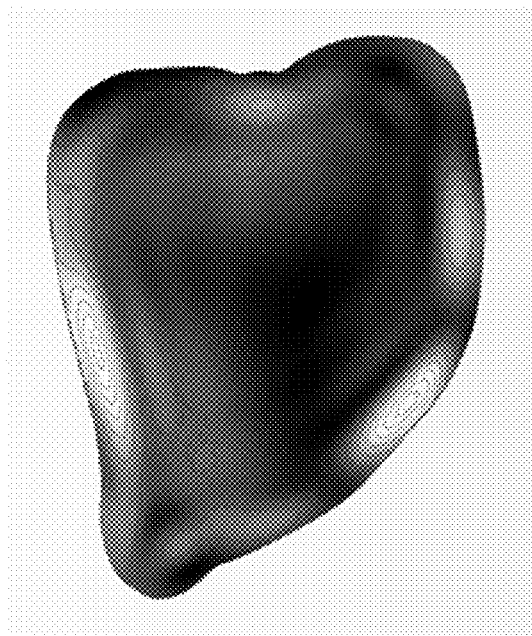

FIGS. 2A, 2B, 2C, and 2D illustrate example diagrams 200 of a heating pattern within food being heated by absorption of RF energy in a microwave oven. For example, FIGS. 2A, 2B, 2C, and 2D illustrate that heating patterns within the food may be controlled either deterministically or non-deterministically through potential control parameters such as, variation of the cooking appliance 102 emitter frequency, power, and in the case of multi-emitter systems, relative phase among emitters; rotation or translation of the food; modification of the cavity geometry or electrical properties; and addition of refracting or reflecting elements (including so-called "mode stirrers") within the microwave propagation path. For example, FIGS. 2A, 2B, 2C, and 2D depict simulated heating patterns in a beef steak with realistic dielectric and thermal properties when the steak is irradiated with microwave energy in a multimode cavity. The simulated cavity has two emitters operating at the same frequency that is chosen to be 2.45 GHz (FIGS. 2A and 2B) or 2.50 GHz (FIGS. 2C and 2D), with relative electromagnetic phase of 0° (FIGS. 2A and 2C) or 90° (FIGS. 2B and 2D). Heating rates are plotted on a range of 0 W/cm³ to 2.5 W/cm³. Variation of the other parameters listed above result in qualitatively similar variations in the resulting heating patterns.

In particular embodiments, to permit effective closed-loop temperature control to achieve a user's desired final temperature profile, the spatially dependent rate of heat deposition may be measured through Fast Pattern Temperature Imaging (FPTI) and/or Adaptive Fast Pattern Temperature Imaging (AFPTI). As an example and not by way of limitation, FPTI and/or AFPTI may measure spatially varying heat deposition via short-duration heating pulses and prompt spatial thermometry to detect small temperature increments in the object being heated, resulting in a two-dimensional image or heat map reflecting the heating rate in degrees per second. The techniques of Fast Pattern Temperature Imaging (FPTI) and/or Adaptive Fast Pattern Temperature Imaging (AFPTI) may utilize any sensors 108 that measure a spatial temperature profile of the load. As an example and not by way of limitation, infrared thermal imaging cameras may be placed outside the cavity of the microwave oven, thus shielded from microwave radiation and/or high temperatures. For example, the infrared thermal imaging cameras may measure the temperature profile of the food through a small aperture in the microwave cavity that permits optical access without allowing RF energy to escape the cavity.

In particular embodiments, selecting a sequence of system control parameters may yield a user-specified final temperature profile, but only if the resulting heating patterns are known by the system. FPTI and/or AFPTI allow for measurement of heat spatial deposition within a load, resulting from each combination of the system control parameters. In appliances using radiative heating, the control parameters may include the phase, frequency of the microwave source (s), power of the microwave source(s), position of the load (which may be rotated or translated), or the position or angle of a reflective or refractive element within the cavity (e.g., mode stirrer). Changes in one or more of the above-mentioned control parameters may yield differing standing-wave patterns. In particular embodiments, closed-loop control of particular control parameter combinations may result in a predictable temperature rise of a load disposed inside a cavity of an electromagnetic device (e.g., cooking appliance 102). Prompt measurements of spatially varying heat deposition for varying control parameter combinations through FPTI and/or AFPTI may generate intelligent heating algorithms, which are particularly valuable in electromagnetic devices, where heat deposition may be intrinsically inhomogeneous, rapid, and difficult to predict a priori. Although the present embodiments demonstrate FPTI and/or AFPTI via radiometric infrared thermal imaging, this disclosure contemplates any suitable sensor 108 technology that yields a prompt and spatially resolved temperature map. In particular embodiments, alternate sensors 108 may include a network of thermistors or thermocouples places near or within the load, such as an array of solid-state thermometers built into the turntable or tray of a cooking appliance 102.

A single FPTI and/or AFPTI pattern may be measured with a noise floor of 50 millikelvin (mK) using a thermal imaging camera with low-cost uncooled microbolometer IR sensors. In this example, for characteristic peak heating rates of 1 Kelvin per second (K/s), ten heating patterns may be measured each second with a signal-to-noise ratio greater than 1 and an overall load temperature rise of less than or equal to 1 Kelvin (K). The heat deposition rate may be calculated as:

$$\text{Heat deposition [Kelivn/second]} = \frac{\text{Temperature2} - \text{Temperature1}}{t_2 - t_1} \quad \text{(Equation 7)}$$

Equation 7, as demonstrated, is a spatially varying function throughout the load and on the surface of the load. If the heating patterns vary substantially as a function of the control parameters being varied, the overall temperature rise of the load may be slower than 1 K/s due to the "hot spot" of the directed heating moving throughout the food during the measurement process. In practice, the number of maps measured may be a function of the noise equivalent temperature difference (NETD) of the measurement device, the total time allowed for the FPTI and/or AFPTI measurement, and the maximum acceptable temperature rise.

As previously discussed, FPTI and/or AFPTI yield measurements of spatially dependent heating of an object arising from a given set of control parameters. This may allow for the prediction of a future temperature profile of the load based upon the current temperature profile of the load and the chosen control parameters for subsequent heating of the load. Although the above descriptions of FPTI and/or AFPTI imply that individual heating patterns may be measured prior to the principal heating or cooking sequence, it is understood that knowledge of the heating patterns may be updated at any time the electromagnetic device (e.g., cooking appliance 102) applies heat with a known set of control parameters. In particular embodiments, it may be advantageous to update knowledge of the heating maps during the main heating sequence to obtain an optimal signal-to-noise ratio. Equation 7 may be rewritten as the following vector equation:

$$K(p_z) = \frac{T_2 - T_1}{t_2 - t_1} \quad \text{(Equation 8)}$$

In Equation 8, $T_1$ is the initial temperature map and $T_2$ is the final temperature map, each of which are represented as a two-dimensional vector of pixels $T_{ij}$. Similarly, K is represented as a two-dimensional vector of heating rates $K_{ij}$ depending on vector $p_z$, which describes the control parameter combinations (such as, for example, microwave frequency and/or the position of the mode stirrer) for the particular parameter combination z applied during the heating between times $t_1$ and $t_2$.

Figure 3:
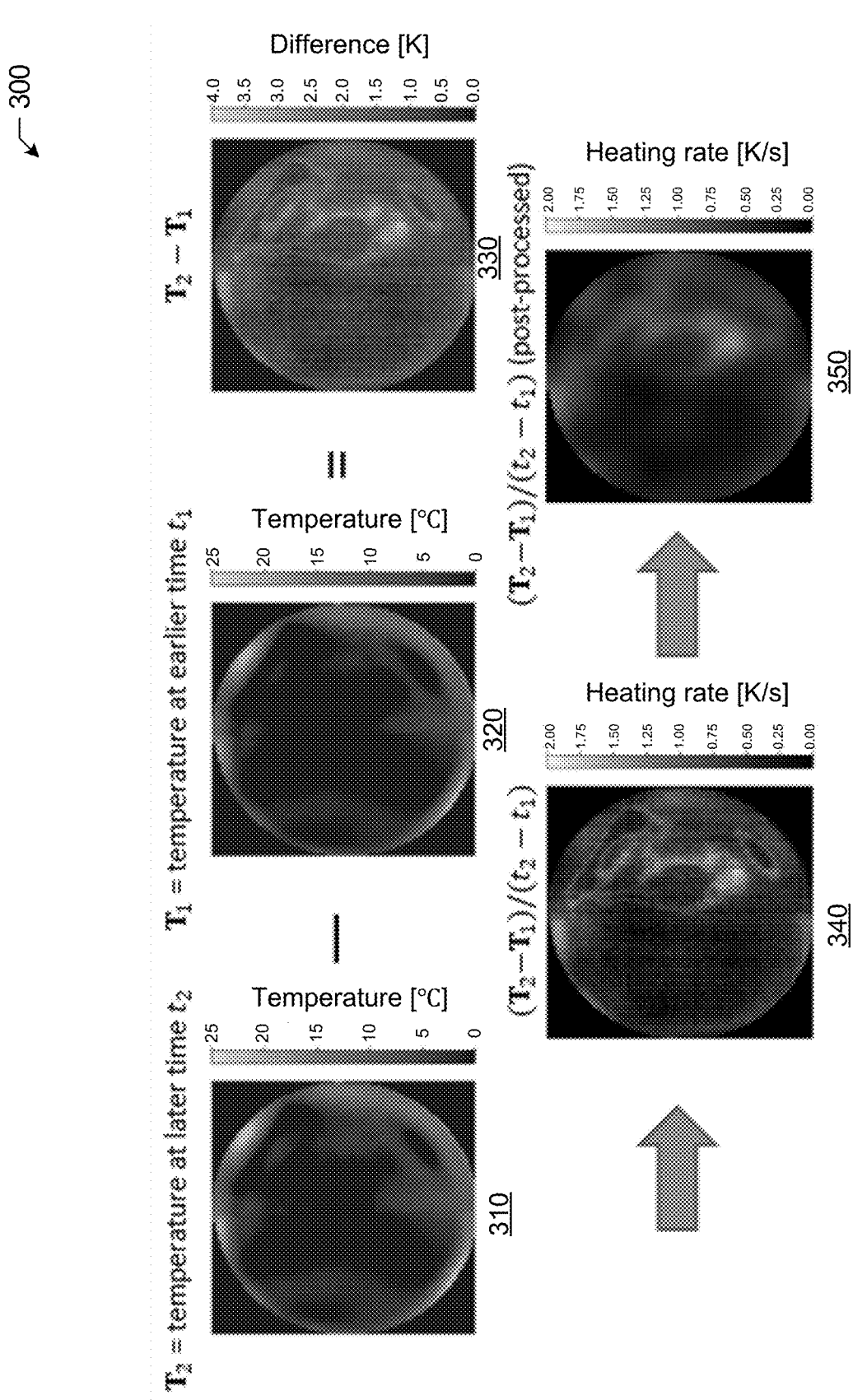
FIG. 3 illustrates an example diagram depicting heating maps.

FIG. 3 demonstrates example diagram 300 depicting heating maps. As an example and not by way of limitation, heat map 310 represents a temperature map $T_2$, where temperature was measured at a later time $t_2$. Heat map 310 may be plotted on a range of 0 to 25 degrees Celsius (° C.). In this example, heat map 320, representing a temperature map $T_2$, where temperature is measured at an earlier time $t_1$, may be subtracted from heat map 310, resulting in heat map 330. Heat map 330 represents a heat map difference $T_2-T_1$, wherein the difference in temperature is plotted on a range of 0.0 to 4.0 K. In this example, heat map 340 may represent a heat map reflecting the differential $$\frac{T_2 - T_1}{t_2 - t_1},$$

plotted on a range of 0.00 to 2.00 K/s. Finally, heat map 350 represents the FPTI heat map after performing optional post-processing steps to smooth, denoise, etc., plotted on a range of 0.00 to 2.00 K/s.

Figure 4:
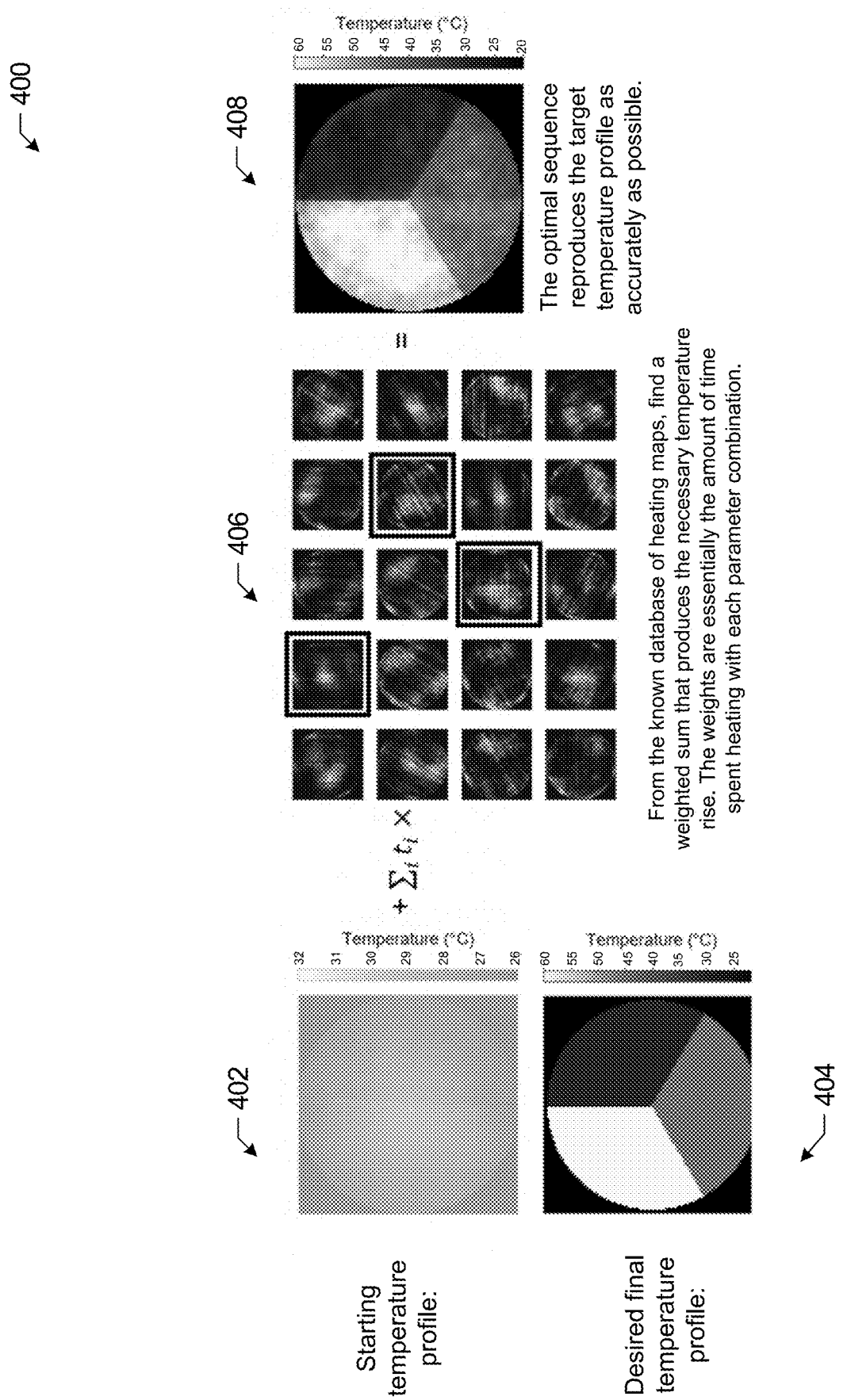
FIG. 4 illustrates an example diagram of calculating an optimal sequence of heating patterns to achieve a target temperature profile.

FIG. 4 illustrates an example diagram 400 of calculating an optimal sequence of heating patterns to achieve a target temperature profile. As an example and not by way of limitation, as illustrated in FIG. 4, the load disposed inside the cavity may have the starting temperature profile 402, in which the left half has initial temperature profile $T_1$, and the right half has an initial temperature profile $T_2$, wherein temperature profile $T_2>T_1$. In particular embodiments, once the set of achievable heating patterns has been predicted or measured, an electromagnetic device (e.g., cooking appliance 102) may then utilize one or more processors 104 to calculate the optimal sequence of control parameters that will yield heating patterns whose sum may achieve a target temperature profile. As an example and not by way of limitation, as illustrated in FIG. 4, the target temperature profile for the load disposed inside the cavity may be a desired final temperature profile 404, in which a first third has a final temperature profile $T_3$, a second third has a final temperature profile $T_4$, and a final third has a final temperature profile $T_5$, wherein temperature profile $T_5>T_4>T_3$. In particular embodiments, in order to achieve a desired final temperature profile 404 from the starting temperature profile 402, the cooking appliance 102 may generally impose a sequential series of distinct heating patterns 406, each arising from a different combination of control parameters. The net effect is the desired temperature rise, as illustrated by the optimum sequence and final temperature profile 408, which reproduces the desired final temperature profile 404 as closely as possible. This is encapsulated in the following equation. Choose optimal $t_i$ such that:

$$\Sigma_i t_i \Delta T(p_i) = (T_{desired} - T_{actual}) \quad \text{(Equation 9)}.$$

In Equation 9, $(T_{desired} - T_{actual})$ is the desired temperature rise map (essentially, a two-dimensional image), $\Delta T(p_i)$ are the temperature increase maps for given parameter combinations $p_i$, and $t_i$ are the times spent heating for each of those combinations. In particular embodiments, no single choice of control parameters may produce the desired temperature profile result, and thus the present embodiments include calculating the correct combination of heating patterns to direct to the load disposed inside the cavity of an electromagnetic device (e.g., cooking appliance 102) such that the cumulative temperature rise results in the desired temperature profile or the best approximation thereof. Since an electromagnetic device may only add heat and not take heat away, the heating times $t_i$ for the patterns used in the series may all be non-negative. Thus, if the individual heating patterns $\Delta T(p_i)$ are known for all possible permutations of control parameters, the non-negative parameters may be solved for by an optimization algorithm, such as non-negative least squares (NNLS). In particular embodiments, constant or temperature-dependent cooling rates of the load may be measured or estimated, and the heating patterns can be corrected for cooling effects to yield better accuracy in the prediction of temperature rise.

In particular embodiments, a two-step process may be implemented for providing two-dimensional heat deposition maps. An optional compression of the heating pattern data via an image decomposition algorithm such as nonnegative matrix factorization may be utilized. This may serve to represent the set of potential heating patterns in a compact subspace and speed up computation. Subsequent calculation of a weighted series of heating patterns via a process such as, nonnegative least squares that best matches the heating profile may be utilized to achieve the target temperature map. In particular embodiments, nonnegative matrix factorization (NNMF) may include an algorithm to deconstruct a set of images as a nonnegative combination of nonnegative basis images, and may be represented mathematically as:

$$\hat{X} = W \times H \qquad \text{(Equation 10)}$$

In Equation 10, $\hat{X}$ is the reconstructed approximation of the original image set, $W$ is a weighting matrix, and $H$ is the set of basis images. Thus, Equation 10 may be utilized to generate heating maps for plausible food geometries and dielectric properties, in which NNMF may represent the full diversity of possible heating patterns within a very low-dimensional basis subspace.

Figure 5:
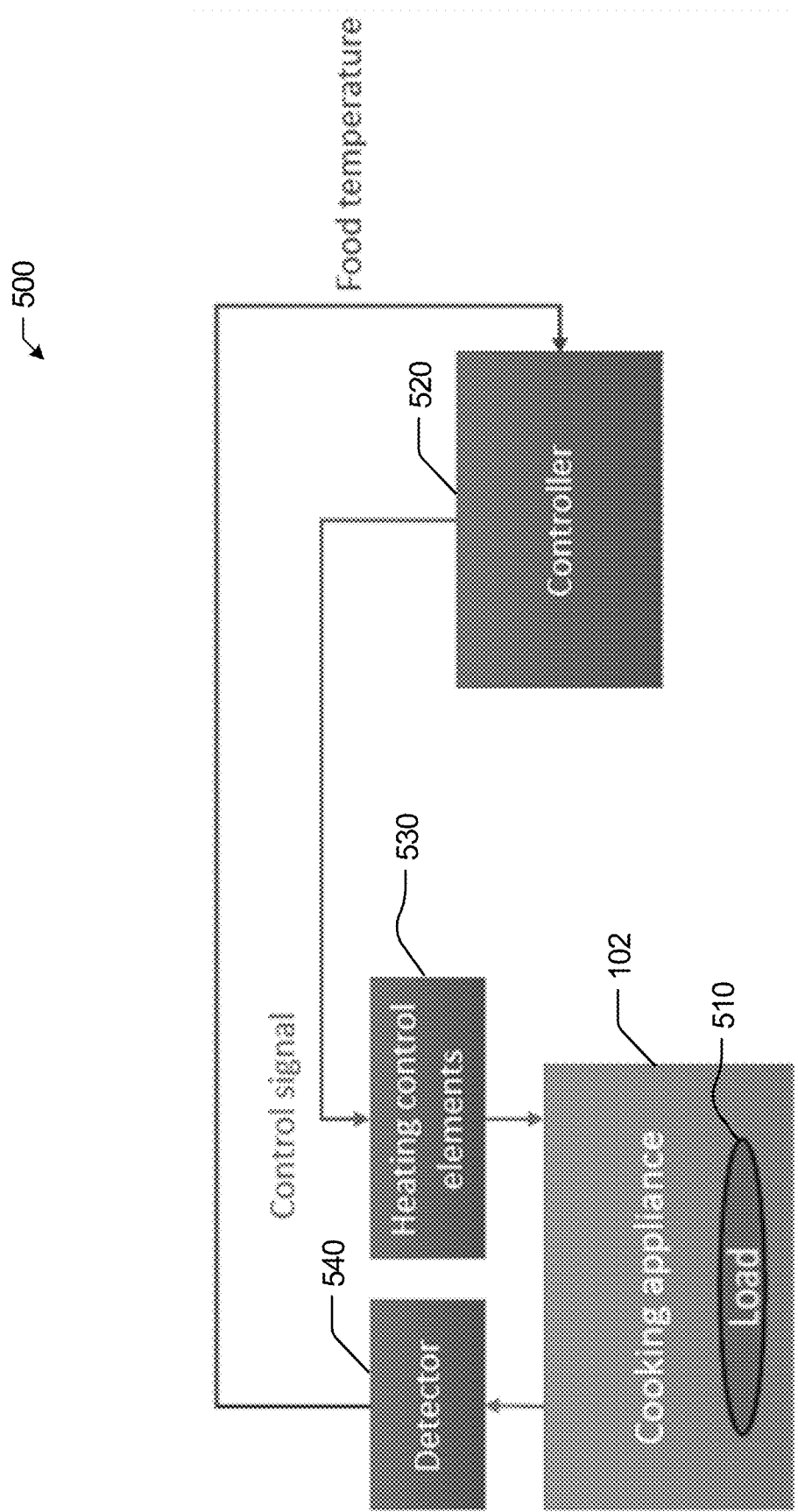
FIG. 5 illustrates an example system diagram for providing a temperature profile-based cooking appliance.

FIG. 5 illustrates an example system diagram 500 for providing a temperature profile-based cooking appliance 102. As illustrated, load 510 is placed inside cooking appliance 102. In particular embodiments, the load 510 may include one or more objects. In particular embodiments, cooking appliance 102 may be operated deterministically by controller 520 and one or more heating control elements 530 may be instructed by the controller 520 to perform mechanical and/or electronic means of modulating the standing-wave pattern with respect to the load 510 within the cavity of cooking appliance 102. In particular embodiments, the desired temperature profile with respect to the load 510 and prior knowledge of the relationship between particular system control parameters and heat deposition with respect to the load 510 may be stored by memory 106 of cooking appliance 102. In particular embodiments, cooking appliance 102 may retrieve, via network interface 116, data corresponding to the relationship between one or more system control parameters and heat deposition with respect to the load 510 from one or more datastores, databases, and/or other suitable method of obtaining prior heat maps with respect to the particular load 510.

In particular embodiments, heating control elements 530 may include control parameters such as RF frequency, phase, power, deterministically controlled turntable, mode stirrer positions, or any other mechanical or electronic means of modulating the standing-wave pattern within the cavity. As an example and not by way of limitation, for a toaster or broiler, heating control elements 530 may be individually controlled heat emitter powers. The one or more heating control elements 530 may be instructed by controller 520 to emit electromagnetic radiation into the cavity based on one or more sequences of control parameters to achieve a target spatial heating rate within the load 510 until a target temperature profile is achieved.

In particular embodiments, detector 540 (e.g., an infrared (IR) camera, thermal camera) may image and/or measure the temperature profile of the load 510 with FPTI and/or AFPTI by directing a plurality of short-duration heating pulses at load 510 and performing prompt spatial thermometry to detect temperature increments in the load 510 before, during, and after heating, thereby generating heating maps. Based on these heating pattern measurements, controller 520 may calculate one or more sequences of control parameters to steer the heating pattern of load 510 towards a target temperature profile, as stored by controller 520. In particular embodiments, the electromagnetic device (e.g., cooking appliance 102) may generate updated sequences of control parameter configurations based on the spatial heating rate within the load 510 as indicated by the one or more heating maps. Based on measurements of the current temperature profile of the load 510 and in conjunction with previously measured heating maps stored by controller 520, the controller 520 may calculate a sequence of control parameters and dwell times via an optimization algorithm, such as non-negative least squares (NNLS). The cooking appliance 102 may then apply heat at the prescribed dwell time for each combination of control parameters until the load 510 achieves the desired final temperature profile.

In particular embodiments, for controller 520 to determine a heating control algorithm, the controller 520 may retrieve one or more data sets of heating patterns that have been previously measured by selecting various control parameter configurations and measure the current temperature profile of the load 510 and compare the current temperature profile load to the target temperature profile as specified by the user. As an example and not by way of limitation, the control parameter configurations may include one or more of a duration for applying the control parameter configuration, a radiation intensity, a radiation frequency, a radiation amplitude, a radiation phase, a radiation phase shift, a load rotation, a load translation, a mode stirrer configuration, etc. Although this disclosure discusses the previously mentioned examples of control parameter configurations, this disclosure contemplates any suitable control parameters and control parameter configurations. In particular embodiments, the controller 520 of cooking appliance 102 may calculate an optimal weighted sequence of control parameter configurations that may result in the target temperature profile. As an example and not by way of limitation, the controller 520 may set individual control parameters at a calculated duration of time before proceeding to implementing the next set of control parameters chosen by the control algorithm. In particular embodiments, the NNLS control algorithm may solve the following equation:

$$\operatorname*{argmin}_{t_i} \left\| T_{target} - T_{act} - \sum_i t_i K(p_i) \right\| \qquad \text{(Equation 11)}$$

In Equation 11, $T_{target}(T_{act})$ represents the desired or target temperature profile, $p_i$ represents a vector representing the $i^{th}$ set of control parameters, $K(p_i)$ represents the heat rise map resulting from control parameter vector $p_i$, $t_i$ represents the time the system spends heating the load at the $i^{th}$ set of control parameters, and $|\cdot|$ denotes the Euclidean norm calculated over the boundary or volume of the load. In particular embodiments, the first output of the heating algorithm is the resulting sequence of $t_i$ values (represented by vector t).

In particular embodiments, the NNLS regression may determine weights for the heating maps associated with the control parameter combinations. The general form of the NNLS may be expressed by the following:

$$\operatorname*{argmin}_{t_i} \|At - y\|_2, \ t_i \geq 0 \ \forall \ i \qquad \text{(Equation 12)}$$

In Equation 12, matrix A represents the set of known heating maps in units of temperature rise per second for the different control parameters, as reduced from multiple dimensions into a 2D matrix. Vector y represents the heat map depicting the total temperature increase to bring the load from its current temperature profile to the desired one. Similarly, vector y is converted to a 1-D vector according to the same ordering as above. In Equation 12, t to be determined is the set of weights to be applied to each of these control parameter combinations. In Equation 11, each component would be equivalent to $t_i$ with units of seconds (i.e., dwell time at each setting). As an example and not by way of limitation, some entries of t may be zero, but all values of t must be non-negative. In particular embodiments, non-negative least chi-square minimization may be used to achieve similar results while taking into account knowledge of uncertainty in the temperature or heating maps.

In particular embodiments, controller 520 of cooking appliance 102 may retrieve one or more previously recorded data sets of temperature rise profiles as a function of system control parameters and construct a two-dimensional (2D) data matrix by row-ordering the images as vector and concatenating the vectors along a second dimension that covers all control parameter permutations. In particular embodiments, controller 520 may separately save the mapping which indicates the correlation between each row in the 2D matrix and the corresponding control parameter combination.

In particular embodiments, this sequence may be ordered or truncated according the implementation of further closed-loop control of the system. As an example and not by way of limitation, different control parameters and sequences of control parameters may be applied in any order, or, alternatively, sorted to anticipate non-commutative effects such as cooling or thermal diffusion. As cooking appliance 102 can only add heat via control of one or more heating control elements 530 and not take away heat, the algorithm deployed by controller 520 is fundamentally non-negative. As a result, dwell times t are strictly non-negative. As an example and not by way of limitation, controller 520 may elect to order the sequence of control parameter combinations so as to minimize the time spend switching between subsequent configurations.

Figure 6:
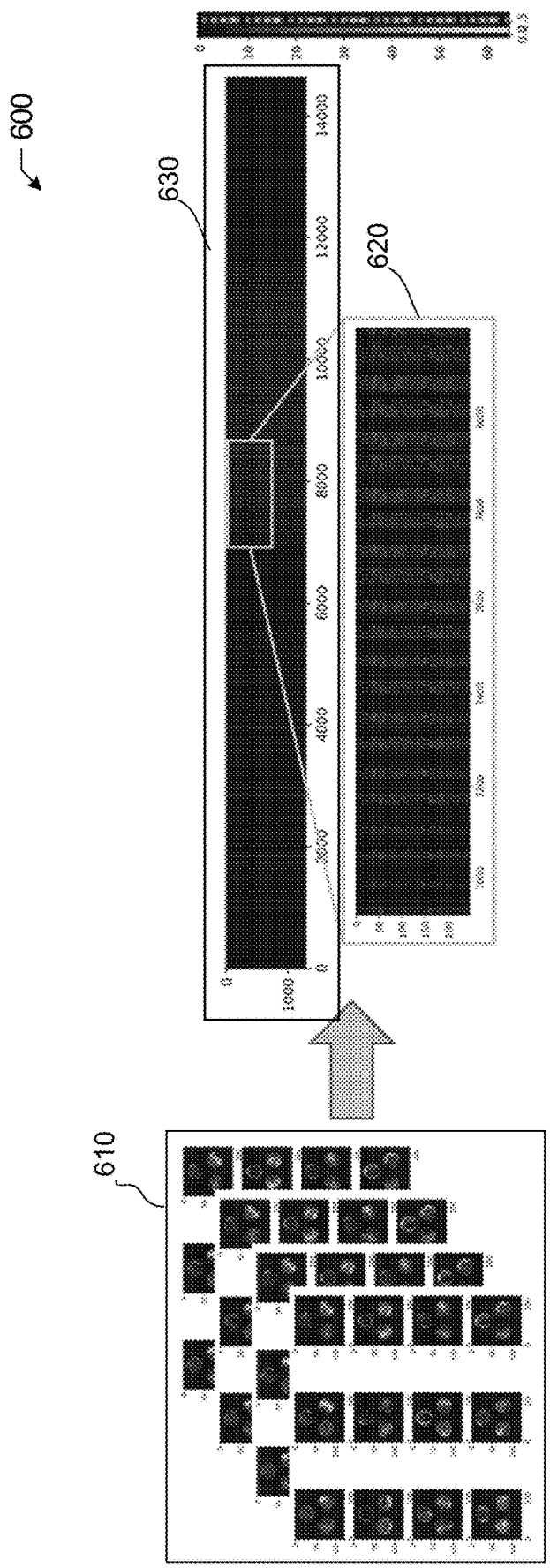
FIG. 6 illustrates an example diagram of a sequence of heating maps and corresponding array.

FIG. 6 illustrates an example diagram 600 of a sequence of heating maps 610 and corresponding array 620. As demonstrated in FIG. 6, the sequence of heating maps 610 may be represented as images measuring 121×121 pixels, one image for each control parameter combination. In this example, the sequence of heating maps 610 were calculated for a solid-state RF oven as a function of twelve load rotations, three emitter frequencies, twelve emitter phases, and three vertical translations and transformed into 2D matrix 630 with 1296 rows (as a result of multiplying the control parameters 12×3×12×3) and 14,641 columns (121× 121). As the control parameters are likely to be multidimensional, the sequence of heating maps may be two or three-dimensional, requiring the images of the heating maps to be ordered into a one-dimensional vector and then concatenated into a 2D matrix, as demonstrated by 2D matrix 630. In practice, there may be multiple combinations of control parameter sequences that yield a similar result.

Figure 7:
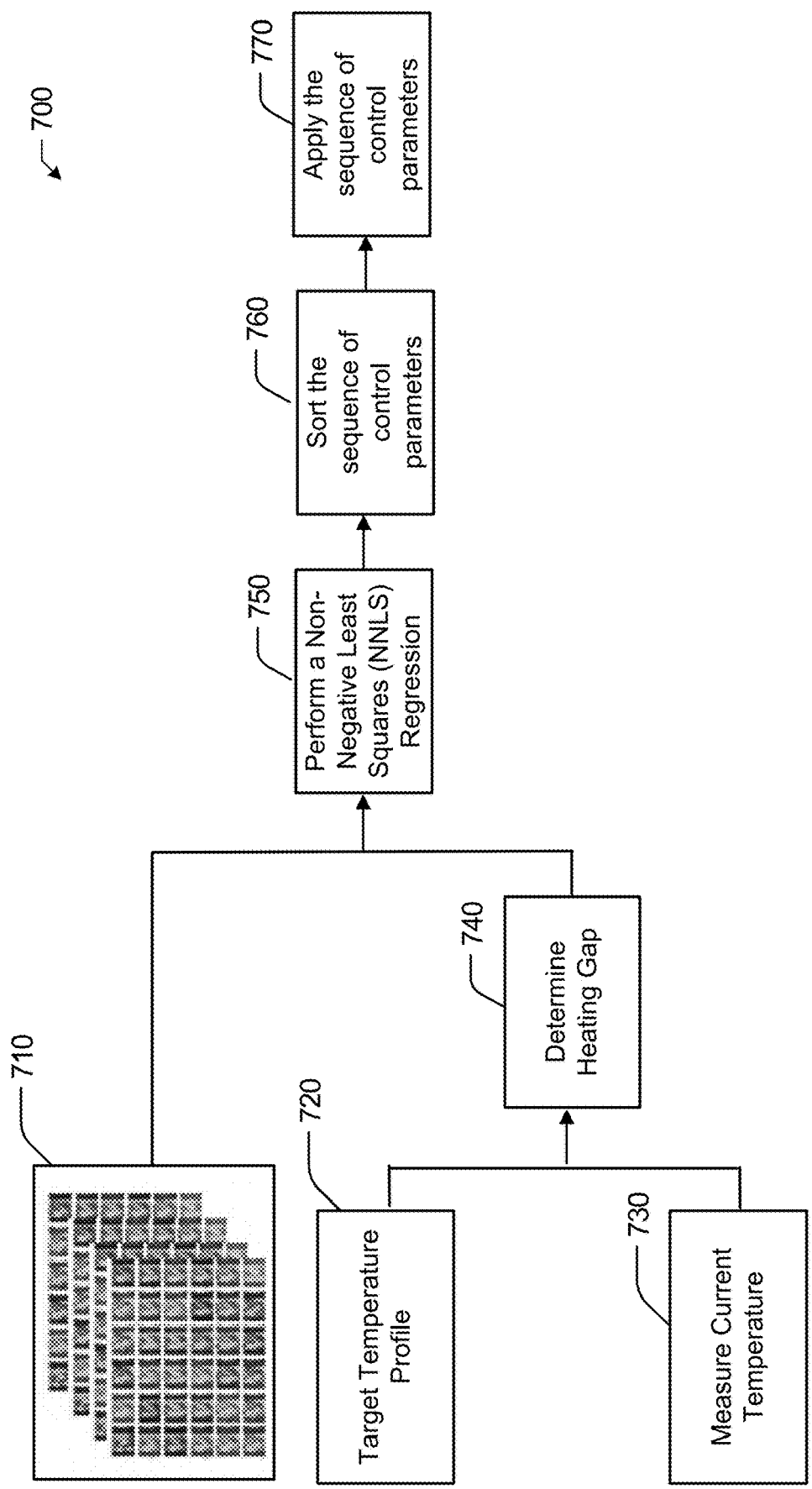
FIG. 7 illustrates an example workflow diagram depicting a technique for implementing an open-loop heating control algorithm for a cooking appliance.

FIG. 7 illustrates an example workflow diagram 700 depicting a technique for implementing an open-loop heating control algorithm for a cooking appliance 102. In particular embodiments, the workflow diagram may begin at step 710, wherein cooking appliance 102 may retrieve one or more previously recorded data sets of heating maps. As an example and not by way of limitation, cooking appliance 102 may retrieve the previously recorded datasets of heating maps by from memory 106 of the cooking appliance 102. As another example and not by way of limitation, cooking appliance 102 may retrieve, via network interface 116, the previously recorded datasets of heating maps from one or more datastores, databases, and/or other suitable method of obtaining prior heat maps with respect to the particular load 510. In particular embodiments, at step 720, cooking appliance 102 may retrieve a previously stored target temperature profile, wherein the target temperature profiles may be stored locally in memory 106 of cooking appliance, or retrieved by network interface 116 from one or more datastores, databases, and/or other external storage. In particular embodiments, the user may define a target temperature profile corresponding to the particular load 510 through a user interface of cooking appliance 102.

At step 730, the electromagnetic device (e.g., cooking appliance 102) may generate a current temperature map of the load 510 disposed inside the cavity. As an example and not by way of limitation, the electromagnetic device may perform the step in step 730 using detector 540 or any suitable thermal imagers to perform prompt spatial thermometry to determine the current temperature profile of the load 510. At step 740, the heating gap may be determined by subtracting the current temperature of load 510 as measured in step 730 from the target temperature profile of step 720. As used herein "heating gap" may refer to the difference in temperature between the target temperature profile of a particular load 510 and the measured current temperature of the particular load 510.

In particular embodiments, at step 750, controller 520 of cooking appliance 102 may perform a NNLS regression to calculate the optimal weight vector t, as disclosed by Equations 11 and 12. As an example and not by way of limitation, based on the control parameter mapping in this basis, controller 520 may construct a sequence of control parameter combinations, wherein each control parameter combination is associated with a corresponding calculated dwell time $t_i$. In particular embodiments, in response to step 750, the heating control algorithm may sort the resulting sequence of control parameters according to one or more criteria, as in step 760. As an example and not by way of limitation, the heating algorithm may sort the sequence of control parameters to start with heat maps that close the heating gap as defined in step 740 the fastest. As another example and not by way of limitation, the heating algorithm may start with applying control parameters according to data from the previously stored heat maps, indicating a particular heat map that applies the most heat to a region of the load 510 determined to be difficult to heat. In particular embodiments, at step 770, the controller 520 may instruct one or more heating control elements 530 to apply heat to the load in accordance with the first set of control parameters $p_i$ indicated by the ordered sequence of step 760. In particular embodiments, the cooking appliance 102 may maintain heating for the calculated dwell time $t_i$. As an example and not by way of limitation, cooking appliance 102 may proceed to step through all non-zero dwell times $t_i$ in the sequence.

Figure 8:
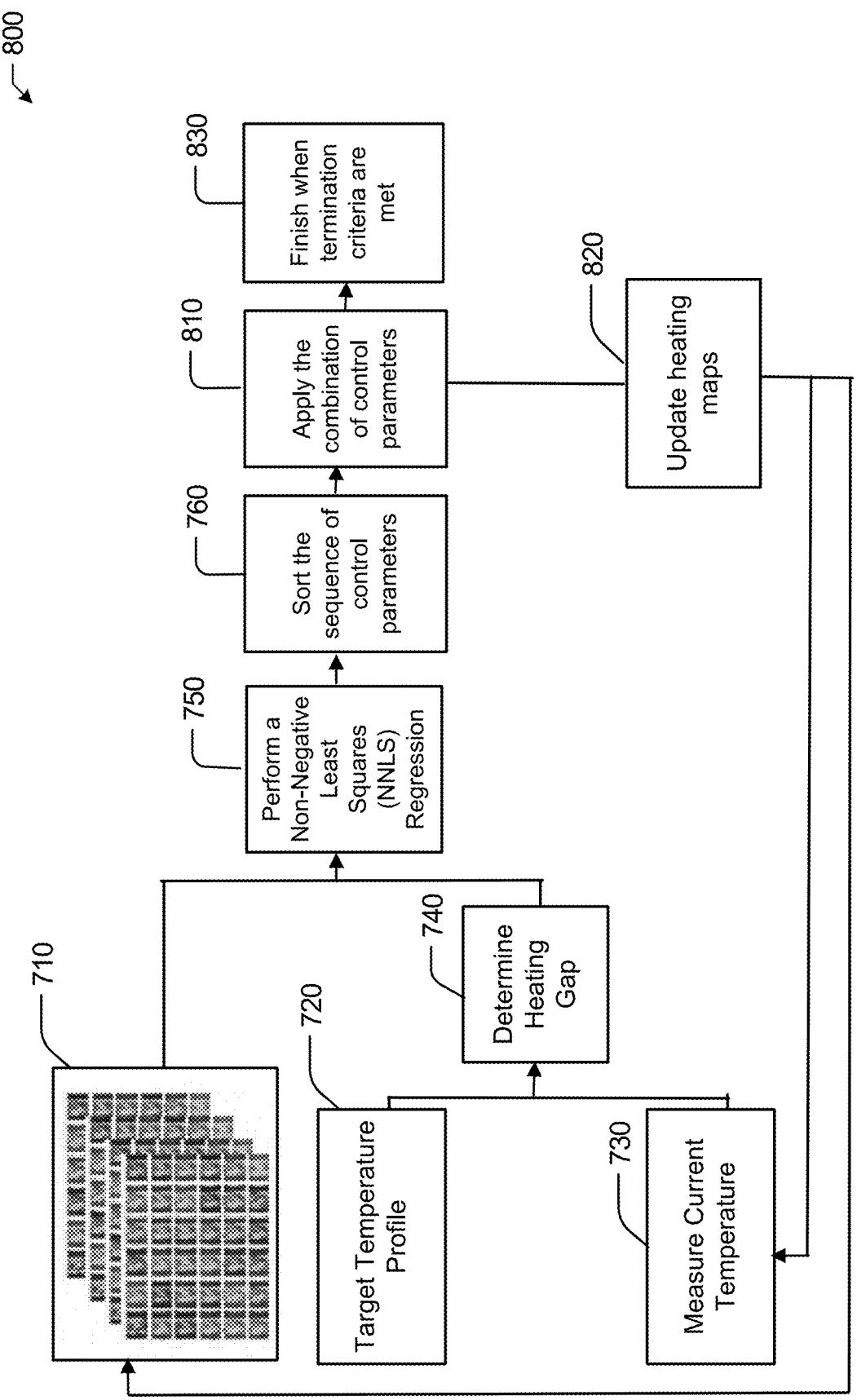
FIG. 8 illustrates an example workflow diagram depicting a technique for achieving a target temperature profile through a closed-loop heating control algorithm.

FIG. 8 illustrates an example workflow diagram 800 depicting a technique for achieving a target temperature profile through a closed-loop heating control algorithm. In particular embodiments, by adding closed-loop control to the heating algorithm, the cooking appliance 102 may account for nonlinearities in the temperature rise and/or fall of the load 510 between sequential heating steps. In particular embodiments, cooling may be approximated by Newton's Law of Cooling:

$$\text{Heat deposition } (T_{Object}, T_{Ambient})[\text{Kelvin/second}] = \frac{\text{Temperature2} - \text{Temperature1}}{t_2 - t_1} - k(T_{Object} - T_{Ambient})$$

(Equation 13)

In Equation 13, k is a constant that may be estimated from prior knowledge. The result of Equation 13 may be a nonlinear rise or fall in load 510 temperature as a function of time, which may result in inaccuracies between the predicted and achieved temperatures. Thus, by breaking the heating process into multiple steps and recalculating the optimal parameter sequence iteratively based upon the actual achieved temperature profile at the end of each step, cooking appliance 102 my approximate the cooling effects as linear for small increments to achieve closer accuracy in the final desired temperature profile. Further, a NNLS closed-loop control heating algorithm may compensate for the fact that many of the heating maps spanning the full parameter space may be unknown or imperfectly known prior to initiation of the initial heating sequence. In addition to generating an updated time sequence of control parameters periodically, the closed-loop heating control algorithm may also allow the cooking appliance 102 to update the originally measured heating maps with the new heating map measured every time a new combination of control parameters is applied.

In particular embodiments, the workflow diagram may begin at step 710, wherein one or more processors 104 of cooking appliance 102 may retrieve one or more previously recorded data sets of heating maps. As an example and not by way of limitation, cooking appliance 102 may retrieve the previously recorded datasets of heating maps by from memory 106 of the cooking appliance 102. As another example and not by way of limitation, cooking appliance 102 may retrieve, via network interface 116, the previously recorded datasets of heating maps from one or more datastores, databases, and/or other suitable method of obtaining prior heat maps with respect to the particular load 510. In particular embodiments, at step 720, cooking appliance 102 may retrieve a previously stored target temperature profile, wherein the target temperature profiles may be stored locally in memory 106 of cooking appliance, or retrieved by network interface 116 from one or more datastores, databases, and/or other external storage. In particular embodiments, the user may define a target temperature profile corresponding to the particular load 510 through a user interface of cooking appliance 102.

In particular embodiments, at step 730, the electromagnetic device (e.g., cooking appliance 102) may generate a current temperature map of the load 510 disposed inside the cavity. As an example and not by way of limitation, the electromagnetic device may perform the step in step 730 using detector 540 or any suitable thermal imagers to perform prompt spatial thermometry to determine the current temperature profile of the load 510. At step 740, the heating gap may be determined by subtracting the current temperature of load 510 as measured in step 730 from the target temperature profile of step 720. In step 750, the heating algorithm of cooking appliance 102 may perform a non-negative least squares regression, as demonstrated in Equations 11 and 12. As an example and not by way of limitation, the heating algorithm may calculate the optimal weight vector t by NNLS, and based upon the control parameter mapping, construct a sequence of control parameters where each control parameter is associated with its respective calculated dwell time $t_i$.

In particular embodiments, in response to step 750, the heating algorithm may sort the resulting sequence of control parameters according to one or more criteria, as disclosed by step 760. As an example and not by way of limitation, the heating algorithm may determine one or more emission configurations and one or more dwell times during which electromagnetic radiation may be applied according to the one or more emission configurations. Further, the heating control algorithm may determine an order in which the one or more emission configurations and the one or more dwell times of the sequence of control parameter configurations are to be applied. As an example and not by way of limitation, the order may be determined by one or more criteria, wherein emitting electromagnetic radiation into the cavity of cooking appliance 102 is determined based on the order of the sequence of control parameter configurations. As an example and not by way of limitation, the heating algorithm may sort the sequence of control parameters in step 760 to start with heat maps that closes the temperature gap the fastest. As another example and not by way of limitation, the heating algorithm may start with the heat map that applies the most heat to the region of the load 510 determined to be difficult to heat. In particular embodiments, each emission configuration may comprise a radiation intensity of radiation to be emitted by one or more heating control elements 530 of cooking appliance 102. As an example and not by way of limitation, controller 520 of cooking appliance 102 may be instructed to determine the radiation intensity for each control parameter configuration and scale the dwell times by the determined radiation intensities, as further discussed in FIG. 9. In particular embodiments, the heating algorithm may automatically predict the total time it may take for the emission of electromagnetic radiation to yield the required temperature rise to achieve the target temperature profile of the load. In response to predicting the total time for the emission of electromagnetic radiation to yield the required temperature rise to achieve the target temperature profile of the load, the electromagnetic device may scale the radiation intensity of the one or more emission configurations to yield a specific heating time.

In particular embodiments, in response to emitting electromagnetic radiation into the cavity, the electromagnetic device may determine a second temperature profile of the load 510, wherein NNLS may be used to calculate dwell times corresponding to the control parameter configurations so as to minimize the squared error between the calculated temperature profile of the load after the electromagnetic radiation is emitted into the cavity for the calculated sequence of control parameters of step 810 and the target temperature profile as retrieved in step 720. As an example and not by way of limitation, the electromagnetic device may use an asymmetric cost function to calculate the dwell times corresponding to the combination of control parameters in step 810. For example, the asymmetric cost function may penalize over-heating and/or under-heating when reducing error between the target temperature profile as retrieved in step 720 and the calculated second temperature profile of the load 510 after electromagnetic radiation is emitted into the cavity of the electromagnetic device. In particular embodiments, radiation intensity may be recalculated and dwell times may be rescaled to achieve a target sum of dwell times.

In particular embodiments, at step 810, the electromagnetic device may apply a first combination of control parameters as previously determined in step 760. As an example and not by way of limitation, the controller 520 may instruct one or more heating control elements 530 to emit heat into the cavity of the cooking device 102 for some time, after which the temperature of load 510 may be remeasured, and the heating maps (e.g., updated current temperature profile of load 510) may be updated, as in step 820. In particular embodiments, after the heating maps are updated in step 820, the heating control algorithm may reperform steps 710 (e.g., retrieving previously recorded data sets of heating maps), 720 (e.g., determining a target temperature profile), and 730 (e.g., measuring the current temperature profile of load 510). As displayed in FIG. 8, the heating algorithm may continue to perform the closed-loop heating process by reperforming the steps outlined in steps 750, 760, 810, and 820 until cooking appliance 102 determines load 510 has achieved a sufficiently similar temperature profile as compared to the target temperature profile in step 720. It is understood that each updated heating map as generated in step 820 may be stored with the plurality of previously recorded heating maps, as retrieved by cooking appliance 102 in step 710. In particular embodiments, after the updated current temperature profile of the load is generated in step 820, the electromagnetic device may calculate a difference between the updated current temperature profile of the load 510, as in step 820, and the target temperature profile of the load 510, as retrieved in step 720. As an example and not by way of limitation, the heating control algorithm of cooking appliance 102 may determine a second sequence of control parameter configurations to apply to achieve the termination criteria of step 830, wherein in response to achieving the termination criteria with respect to the load 510, the cooking appliance 102 may suspend emission of electromagnetic radiation into the cavity by the one or more heating control elements 530.

In particular embodiments, at step 830, the heating algorithm may terminate when one or more termination criteria are met. As an example and not by way of limitation, NNLS may provide a natural termination criteria in that the calculated dwell times will reach zero if adding heat to the system will only increase the discrepancy between the measured current temperature in step 730 and the target temperature profile in step 720. As another example and not by way of limitation, the heating algorithm may terminate the heating process in step 830 if any portion of the load 510 exceeds a threshold temperature. Although this disclosure contemplates the abovementioned termination criterion, this disclosure contemplates any suitable termination criterion.

Figure 9:
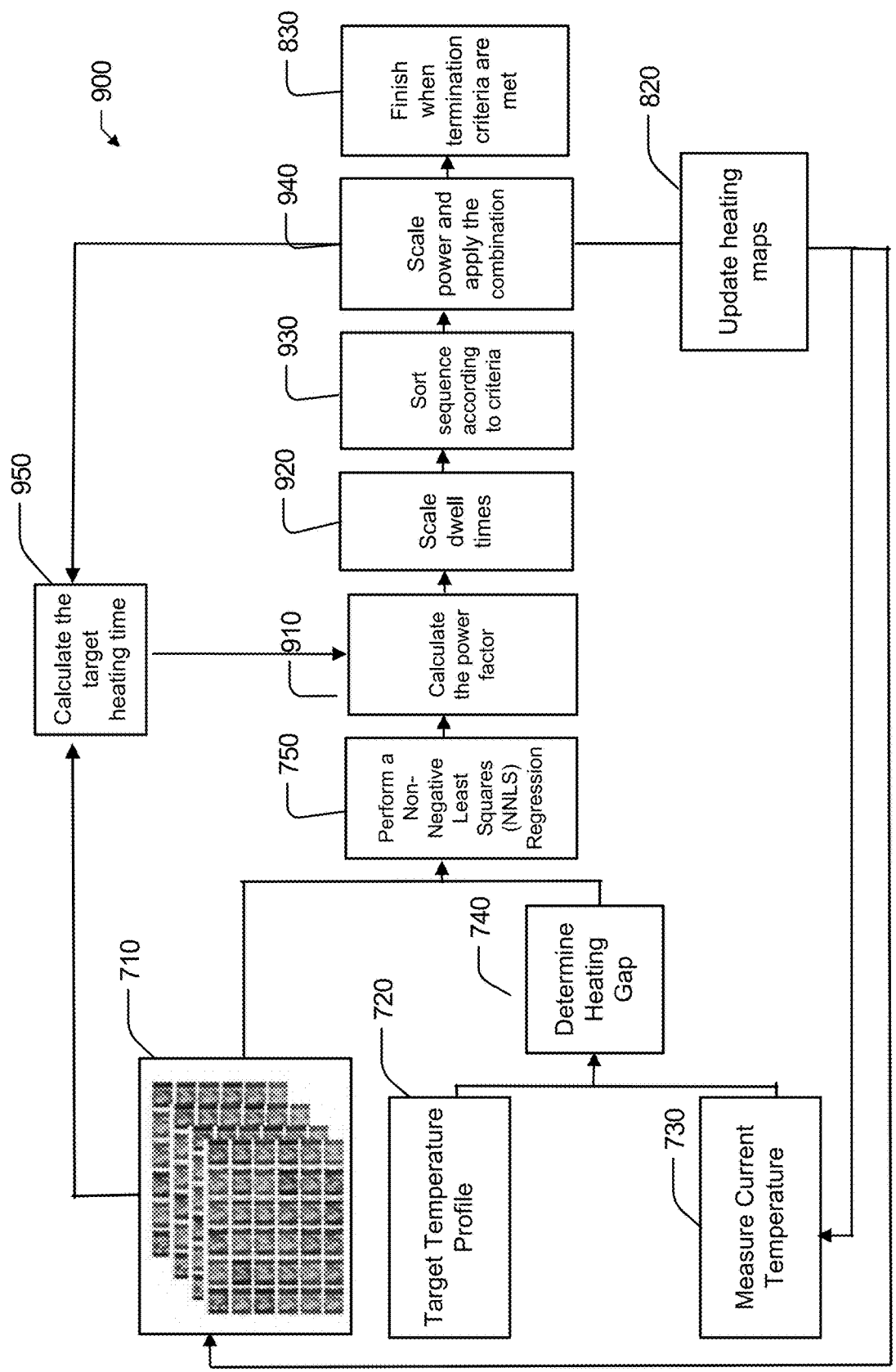
FIG. 9 illustrates an example workflow diagram depicting a technique for achieving a target temperature profile through an adaptive power control heating algorithm.

FIG. 9 illustrates an example workflow diagram 900 depicting a technique for achieving a target temperature profile through an adaptive power control heating algorithm. As discussed in FIG. 8, closed-loop control of the heating algorithm requires a termination criterion. As used herein, "termination criterion" may refer to one or more criterion that when met, instructs the heating control algorithm to terminate. In particular embodiments, the termination criterion may be based on a comparison between the current temperature profile of the load 510 and the target temperature profile of the load 510. For example, if the target temperature profile of the beef steak in FIGS. 2A-2D (e.g., load 510) is 62° C., the heating control algorithm may perform closed-loop control of the system until the beef steak reaches the target temperature profile of 62° C., upon which the heating algorithm may instruct heating control element 530 to terminate the emission of heat (e.g., radiation). In this example, where the termination criterion requires that the heating gap be 0° C., the control process may never terminate as it is generally not possible to achieve the target temperature profile to exact precision. In this case, the heating time may be very long and unpredictable. However, if the termination criterion is less strict, such as for example a heating discrepancy of <10° C. for all points of the load 510, the heating time may be more predictable.

In particular embodiments, an estimate of the remaining heating time may be derived in each iteration of the closed-loop control heating algorithm by summing the dwell times calculated by NNLS. In this example, however, the estimates of remaining heating time may fluctuate strongly between iterations when each iteration provides a dramatically different mean heating rate (e.g., a lower heating rate may require a longer dwell time to have an equivalent impact on the temperature profile as a higher heating rate). In particular embodiments, Adaptive Power Control (APC) may be employed to determine an accurate estimate of remaining heating time. In this example, APC may use one or more control parameters common to all cooking appliances 102 as an independent control parameter that when adjusted, achieves the pre-determined target heating time. As an example and not by way of limitation, the power or intensity of the heating source (e.g., heating control elements 530) may be an example of an independent control parameter APC could adjust. In this example, increasing or decreasing the power or intensity of the heating control elements 530 may speed up or slow down the heating process. As an example and not by way of limitation, the heating rate may scale proportionally with the power of the heating source, such that an N-fold increase in the power may result in a uniform N-fold decrease in all weights calculated by the NNLS heating algorithm. In this way, APC may allow the system to ensure that the NNLS-predicted dwell times sum to the allotted remaining time in each iteration of the closed-loop algorithm. As a result, the cooking appliance 102 may adapt the overall heating power in conjunction with the elected heating patterns to achieve the target temperature profile of load 510 in a specified amount of time. As an example and not by way of limitation, a user may specify the amount of time allowed for cooking appliance 102 to achieve the target temperature profile of load 510.

In particular embodiments, the method of Adaptive Power Control (APC) may begin at step 710 where one or more processors 104 of the electronic device (e.g., cooking appliance 102) may instruct the electronic device to retrieve both one or more previously recorded data sets of heating maps for the possible control parameter combinations, excluding the total power or intensity of one or more heat sources, as input for the heating algorithm. As an example and not by way of limitation, cooking appliance 102 may retrieve the previously recorded datasets of heating maps by from memory 106 of the cooking appliance 102. As another example and not by way of limitation, cooking appliance 102 may retrieve, via network interface 116, the previously recorded datasets of heating maps from one or more datastores, databases, and/or other suitable method of obtaining prior heat maps with respect to the particular load 510. In particular embodiments, at step 720, cooking appliance 102 may retrieve a previously stored target temperature profile, wherein the target temperature profiles may be stored locally in memory 106 of cooking appliance, or retrieved by network interface 116 from one or more datastores, databases, and/or other external storage. In particular embodiments, the user may define a target temperature profile corresponding to the particular load 510 through a user interface of cooking appliance 102.

In particular embodiments, at step 730, the electromagnetic device (e.g., cooking appliance 102) may generate a current temperature map of the load 510 disposed inside the cavity. As an example and not by way of limitation, the electromagnetic device may perform the step in step 730 using detector 540 or any suitable thermal imagers to perform prompt spatial thermometry to determine the current temperature profile of the load 510. At step 740, the heating gap may be determined by subtracting the current temperature of load 510 as measured in step 730 from the target temperature profile of step 720. In step 750, the heating algorithm of cooking appliance 102 may perform a non-negative least squares regression, as demonstrated in Equations 11 and 12. As an example and not by way of limitation, the heating algorithm may calculate the optimal weight vector t by NNLS, and based upon the control parameter mapping, construct a sequence of control parameters where each control parameter is associated with its respective calculated dwell time $t_i$.

In particular embodiments, using the sum of all calculated dwell times $t_i$, the heating algorithm may calculate the power factor, by which the present set of heating maps must be scaled to in order to achieve the target heating time, at step 910. The power factor may be calculated by the following equation:

$$\text{Power Factor} = \frac{\sum_{i=0}^{iMax} t_i}{\text{Target heating time}} \quad \text{(Equation 14)}$$

At step 920, the heating algorithm may scale the applied total power (e.g., independent APC control parameter) by the power factor calculated in step 910. For example, if the NNLS heating algorithm determines that the sum of all predicted dwell times is larger than the target heating time, the heating algorithm may adapt the overall heating power (e.g., increase the applied power) in conjunction with the elected heating patterns to achieve the target temperature profile of load 510 in a specified amount of time. As an example and not by way of limitation, the independent APC control parameter may be the net power applied to the load.

In particular embodiments, at step 930, the heating control algorithm may sort the resulting sequence of control parameters according to one or more criteria. As an example and not by way of limitation, the heating algorithm may sort the sequence of control parameters to start with heat maps that closes the heating gap as determined in step 740 the fastest. As another example and not by way of limitation, the heating algorithm may start with the map that applies the most heat to the region of the load 510 determined to be difficult to heat.

At step 940, the heating control algorithm may instruct the electromagnetic device to scale power on the one or more heating control elements 530 in accordance with the power factor calculated at step 910 and apply heat for the first one or more control parameter combinations. In response to applying the first one or more control parameter combinations, the heating algorithm may instruct the electromagnetic device to generate updated heating maps at step 820. In particular embodiments, after performing the functions as in step 940, a target heating time may be calculated in step 950, wherein the target heating time, in combination with the previously recorded data sets of heating maps in step 710 may be used as input for step 910, of calculating the power factor.

In particular embodiments, after the heating maps are updated in step 820, the heating control algorithm may reperform steps 710 (e.g., retrieving previously recorded data sets of heating maps), 720 (e.g., determining a target temperature profile), and 730 (e.g., measuring the current temperature profile of load 510). In this way, the target heating time may be updated according to the elapsed time. Active monitoring of the temperature rise during heating through the closed-loop control of steps 710, 720, 730, 740, 750, 910, 920, 930, 940, 950, and 820 results in accurate, real-time data sets for use in the next iteration of the closed-loop algorithm.

As previously discussed in FIG. 8, the heating algorithm may finish when termination criterion is met, as in step 830. As an example and not by way of limitation, NNLS may provide a natural termination criteria in that the calculated dwell times will reach zero if adding heat to the system will only increase the discrepancy between the measured and the target temperature profiles. As another example and not by way of limitation, the heating algorithm may terminate the heating process if any portion of the load 510 exceeds a threshold temperature. Although this disclosure contemplates the abovementioned termination criterion, this disclosure contemplates any suitable termination criterion.

Figure 10:
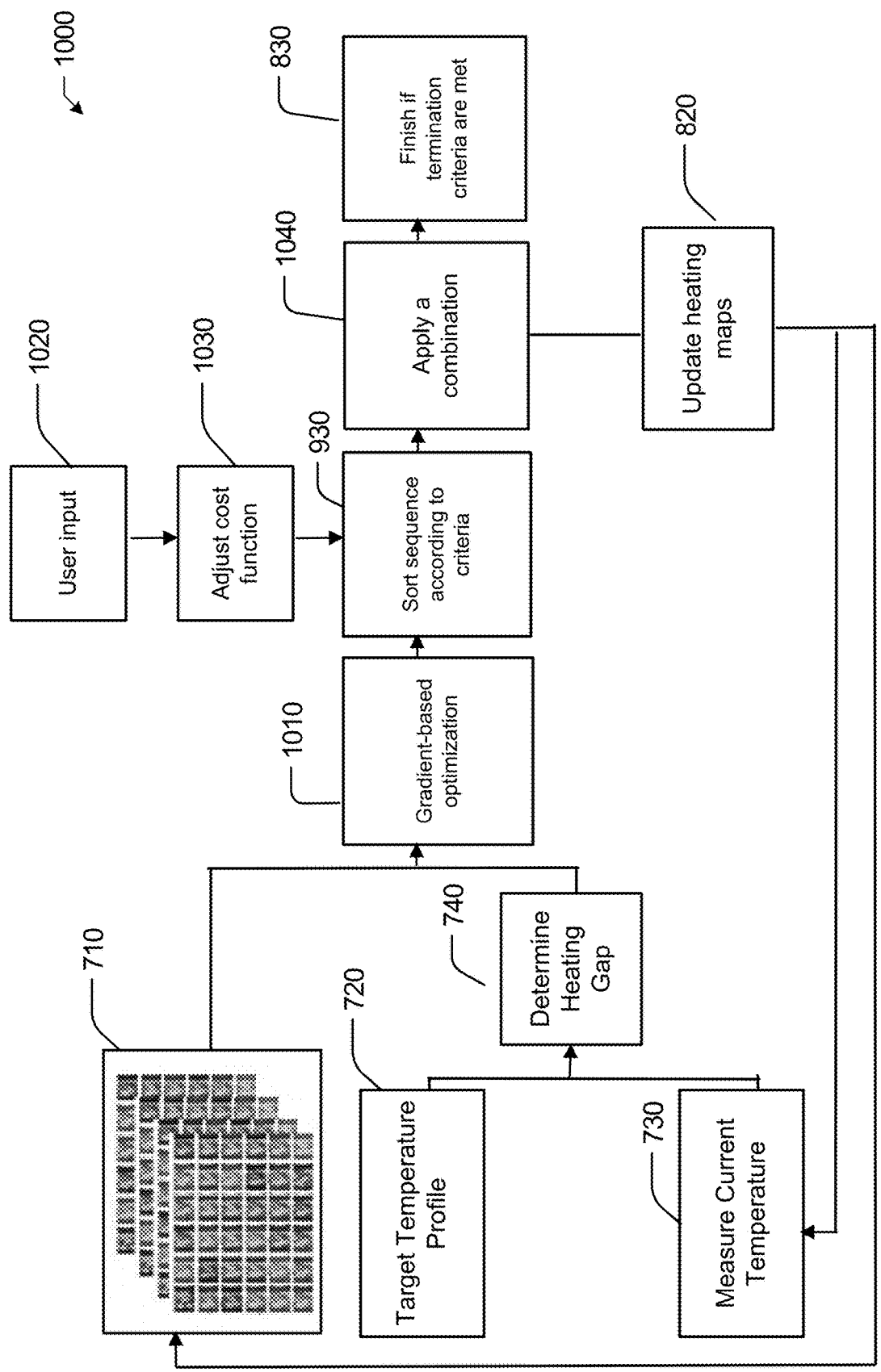
FIG. 10 illustrates an example workflow diagram depicting a technique for achieving a target temperature profile through a tailored cost function algorithm.

FIG. 10 illustrates an example workflow diagram 1000 depicting a technique for achieving a target temperature profile through a tailored cost function algorithm. In particular embodiments, diagram 1000 may begin at step 710 where one or more processors 104 of the electronic device (e.g., cooking appliance 102) may instruct the electronic device to retrieve both one or more previously recorded data sets of heating maps for the possible control parameter combinations, excluding the total power or intensity of one or more heat sources, as input for the heating algorithm. As an example and not by way of limitation, cooking appliance 102 may retrieve the previously recorded datasets of heating maps by from memory 106 of the cooking appliance 102. As another example and not by way of limitation, cooking appliance 102 may retrieve, via network interface 116, the previously recorded datasets of heating maps from one or more datastores, databases, and/or other suitable method of obtaining prior heat maps with respect to the particular load 510. In particular embodiments, at step 720, cooking appliance 102 may retrieve a previously stored target temperature profile, wherein the target temperature profiles may be stored locally in memory 106 of cooking appliance, or retrieved by network interface 116 from one or more datastores, databases, and/or other external storage. In particular embodiments, the user may define a target temperature profile corresponding to the particular load 510 through a user interface of cooking appliance 102.

In particular embodiments, at step 730, the electromagnetic device (e.g., cooking appliance 102) may generate a current temperature map of the load 510 disposed inside the cavity. As an example and not by way of limitation, the electromagnetic device may perform the step in step 730 using detector 540 or any suitable thermal imagers to perform prompt spatial thermometry to determine the current temperature profile of the load 510. At step 740, the heating gap may be determined by subtracting the current temperature of load 510 as measured in step 730 from the target temperature profile of step 720.

In particular embodiments, at step 1010, the heating control algorithm may perform gradient-based optimization, which may or may not include NNLS. As an example and not by way of limitation, gradient-based optimization may construct a sequence of control parameters where each control parameter is associated with its respective calculated dwell time $t_i$. Because the heating control algorithm may not indicate an order in which the resulting sequence of control parameters should be applied, the heating control algorithm may sort the sequence of control parameters according to one or more criteria, as in step 930. As an example and not by way of limitation, the gradient-based heating algorithm may sort the sequence of control parameters to start with heat maps that closes the heating gap as determined in step 740 the fastest. As another example and not by way of limitation, the heating algorithm may start with the map that applies the most heat to the region of the load 510 determined to be difficult to heat. In particular embodiments, at step 1020, a user may provide input as to a specified heating time and/or a desired temperature change through a user-interface of cooking appliance 102. Based on the user-input in step 1020, a cost function may be adjusted in step 1030. As used herein, "cost function" may refer to a function used in the heating control algorithm to penalize particular properties and/or enforce sparsity in the output sequence. As an example and not by way of limitation, the cost function used in the heating control algorithm may be adjusted to penalize over-heating or under-heating of load 510. As another example and not by way of limitation, the cost function used in the heating control algorithm may be used to enforce sparsity in the output sequence by minimizing the number of different control parameter configurations used by the heating control algorithm. In particular embodiments, the cost function may be the squared difference between the target temperature and measured current temperature, summed over a region of interest, wherein NNLS may be a method for minimizing this specific cost function.

In particular embodiments, in response to the sequence of control parameters being sorted according to a criteria, as in step 930, the heating control algorithm may apply a first combination of control parameters in step 1040. As an example and not by way of limitation, at step 1040, the heating control algorithm may instruct the one or more heating control elements 530 of the electromagnetic device to emit electromagnetic radiation and/or control one or more control parameters in line with the first combination of control parameters as determined by sorting the sequence of control parameters in step 930. In response to applying the first combination of control parameters, the heating control algorithm may instruct the electromagnetic device to generate updated heating maps at step 820. In particular embodiments, after the heating maps are updated in step 820, the heating control algorithm may reperform steps 710 (e.g., retrieving previously recorded data sets of heating maps), 720 (e.g., determining a target temperature profile), and 730 (e.g., measuring the current temperature profile of load 510. In this way, the target heating time may be updated according to the elapsed time. Active monitoring of the temperature rise during heating through the closed-loop control of steps 710, 720, 730, 740, 1010, 1020, 1030, 930, and 1040 results in accurate, real-time data sets for use in the next iteration of the closed-loop algorithm.

In particular embodiments, a heating algorithm other than NNLS may be utilized, as NNLS penalizes positive and negative errors equally, which may not accurately reflect a user's preference. For example, delicate foods such as shellfish will suffer irreversible degradations in quality if overheated. As an example and not by way of limitation, a user may indicate that the food being heated is delicate and be presented with an option in the user interface of the electromagnetic device to accept slower heating. As another example and not by way of limitation, the user may be presented with an option in the user interface of the electromagnetic device to accept slightly under-heated regions in the final temperature profile of the load to avoid over-heating. In these cases, it may be preferred to choose a cost function in the heating algorithm that is not symmetric in the sign of the temperature error. In particular embodiments, gradient-based optimization may calculate the derivative of the cost function with respect to the variable parameters and then incrementally update estimation of those parameters by iteratively following the gradient that minimizes the cost function. In this embodiment, the cost function of the heating algorithm may be modified to penalize over-heating or under-heating of the load 510. As an example and not by way of limitation, these cost functions may be differentiable, and a gradient-based optimization approach may be used to calculate the resulting parameter sequence.

As previously discussed, the heating times spent at the individual parameter combinations $p_i$ is denoted by $t_i \to t$. In particular embodiments, $C(t, T_{target}, T_{act})$ may denote the cost function for the particular sequence, including a positive cost for deviation of the instantaneous actual temperature $T_{act}$ from $T_{target}$, and load 510 may be assumed to begin at temperature $T_0$. In this example, it is understood that all temperatures may be spatially varying over the load, and the cost function is summed over all load positions. In this example, the final temperature profile at the end of the sequence is given by $T_{final} = T_0 + \Sigma_i t_i K(p_i)$. For simplicity, the final temperature metric may be defined as the following:

$$z = \frac{T_{final} - T_{target}}{T_0 - T_{target}} \qquad \text{(Equation 15)}$$

In Equation 15, the final temperature metric may be spatially summed over the load 510. In particular embodiments, C may be added to the cost function $C_z$, in which C represents an added penalty for overheating, as represented by the following:

$$C_z = \Theta(z) f_+(z) + \Theta(-z) f_-(z) \qquad \text{(Equation 16)}$$

In Equation 16, $f_\pm$ represents smooth polynomial functions of z for $z<0$ and $z>0$, and $\Theta(z)$ may represent the Heaviside function: $\Theta(z)=0$ for $z<0$ and 1 for $z>0$. Because $\Theta(z)$ is not differentiable, ultimately invalidating a gradient-based approach, $\Theta(z)$, by way of example may be replaced with the following sigmoid function:

$$\sigma_k(z) = (1 + e^{-2kz})^{-1} \qquad \text{(Equation 17)}$$

Although this disclosure discusses the above sigmoid function, this disclosure contemplates any suitable smooth function to replace the above-mentioned Heaviside function. Equation 17 becomes $\Theta(z)$ in the limit that $k \to \infty$. In this case, the derivative of the cost function with respect to z becomes:

$$C_k'(z) = \sigma_k(z)[2k(1-\sigma_k(z))f_+(z) + f_+'(z)] + \sigma_k(-z)[2k(1-\sigma_k(-z))f_-(z) - f_-'(z)] \qquad \text{(Equation 18)}$$

In particular embodiments, the cost function may be differentiated with respect to the sequence of dwell times $t_i$. As an example and not by way of limitation, methods such as gradient descent and/or conjugate gradients may be used to determine an optimal sequence of control parameters. Although this disclosure discusses gradient descent and/or conjugate gradients for finding an optimal sequence, this disclosure contemplates any suitable method of determining an optimal sequence.

Figure 11:
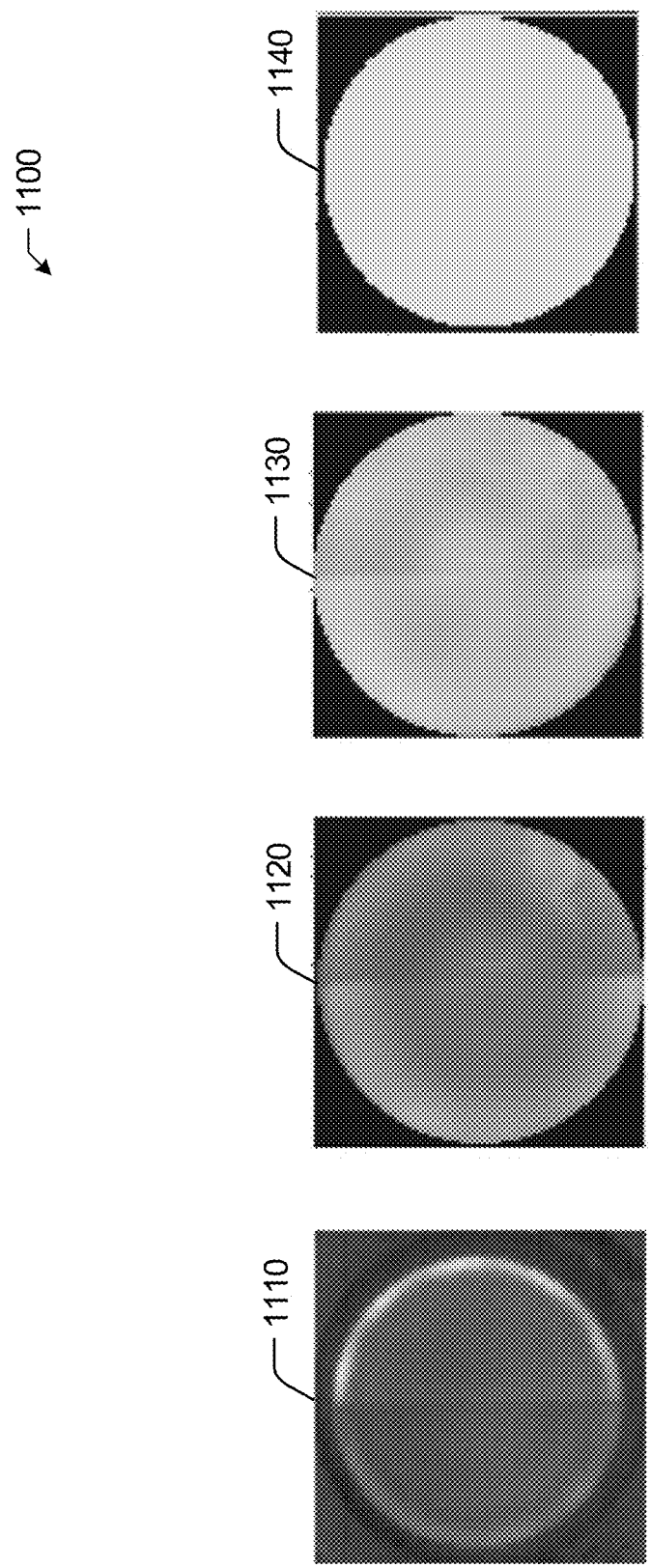
FIG. 11 illustrates a diagram of example temperature profiles measured with different implementations of the heating control algorithm.

FIG. 11 illustrates a diagram 1100 of example temperature profiles measured with different implementations of the heating control algorithm. Image 1110 demonstrates a typical temperature profile of a load 510 as measured for a standard cooking appliance 102 in the absence of a heating control algorithm, wherein no control parameter sequence was calculated or enacted. Image 1120 demonstrates results achieved by cooking appliance 102 when load 510 was heated according to a control parameter sequence as calculated by open-loop control of the heating control algorithm. Image 1130 demonstrates results achieved by cooking appliance 102 when load 510 was heated according to one or more control parameter sequences as calculated by closed-loop control of the heating control algorithm. Image 1140 demonstrates a user-specified target temperature profile. In this example, the user-specified target temperature profile is a homogenous temperature profile at 60° C. As demonstrated by the images of FIG. 11, image 1130 most closely achieves the user-specified temperature profile of image 1140.

Figure 12A:
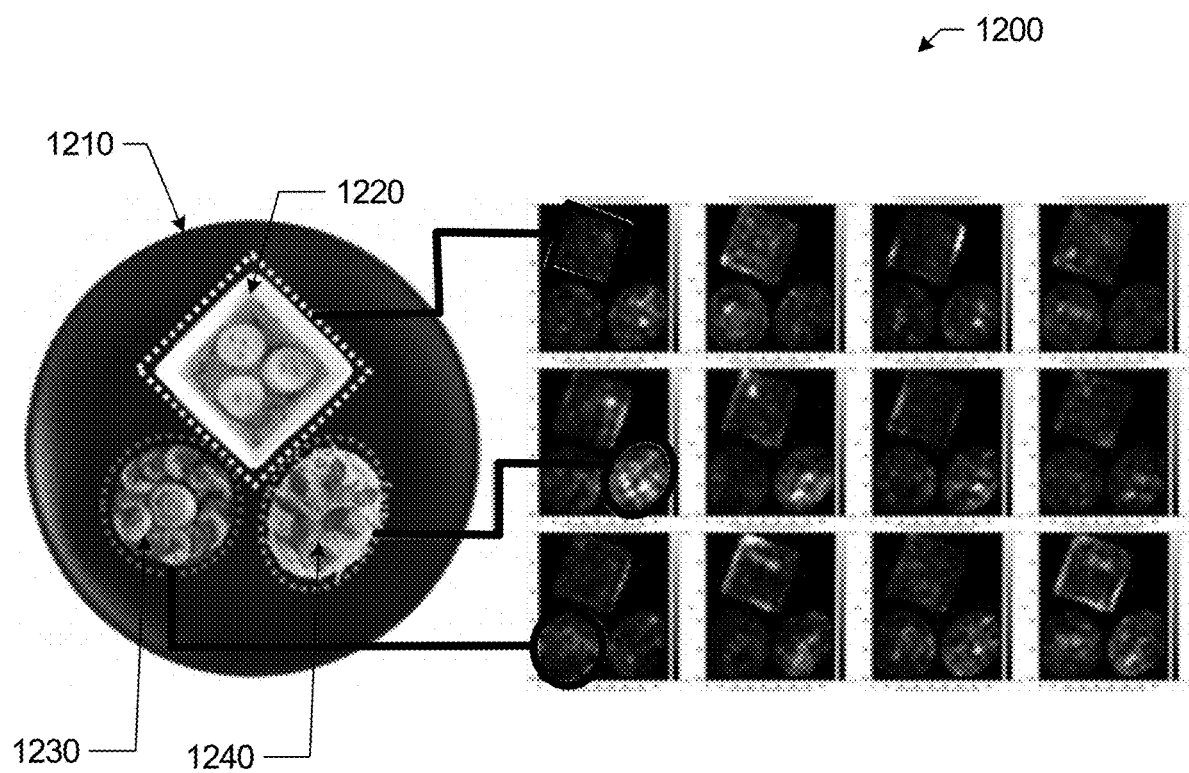
FIGS. 12A and 12B illustrate example diagrams depicting heating maps utilizing a temperature profile-based cooking appliance with multiple loads.
Figure 12B:
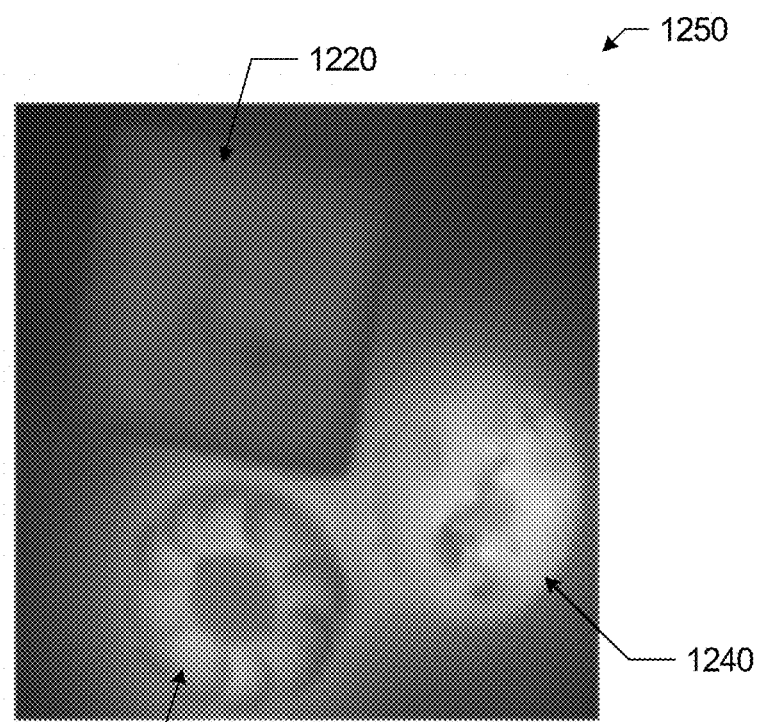

FIGS. 12A-12B illustrate example diagrams 1200 and 1250, depicting heating maps utilizing a temperature profile-based cooking appliance 102 with multiple loads 510. For example, plate 1210 demonstrates three different foods, food 1220, food 1230, and food 1240. The spatial deposition within each of foods 1220, 1230, and 1240 may vary for different control parameter configurations, as indicated in the corresponding heat maps of diagram 1200 as measured by FPTI and/or AFPTI. For example, each food 1220, 1230, 1240 may have a particular optimal final temperature profile and must be heated individually to a specific target temperature by the selection of an optimal sequence of control parameters by the heating control algorithm throughout the heating process. Example diagram 1250 of FIG. 12B demonstrates the final temperature profile of plate 1210 showing different mean temperatures for each food 1220, 1230, and 1240. In particular embodiments, each portion of the plate 1210 may be deterministically heated to a customized target temperature profile. Example diagrams 1200 and 1250 demonstrate active measurement of heating maps for each food 1220, 1230, and 1240 by deterministic control of system parameters to generate a user-specified heating pattern, wherein each food 1220, 1230, and 1240 may be heated to different target temperatures.

Figure 13A:
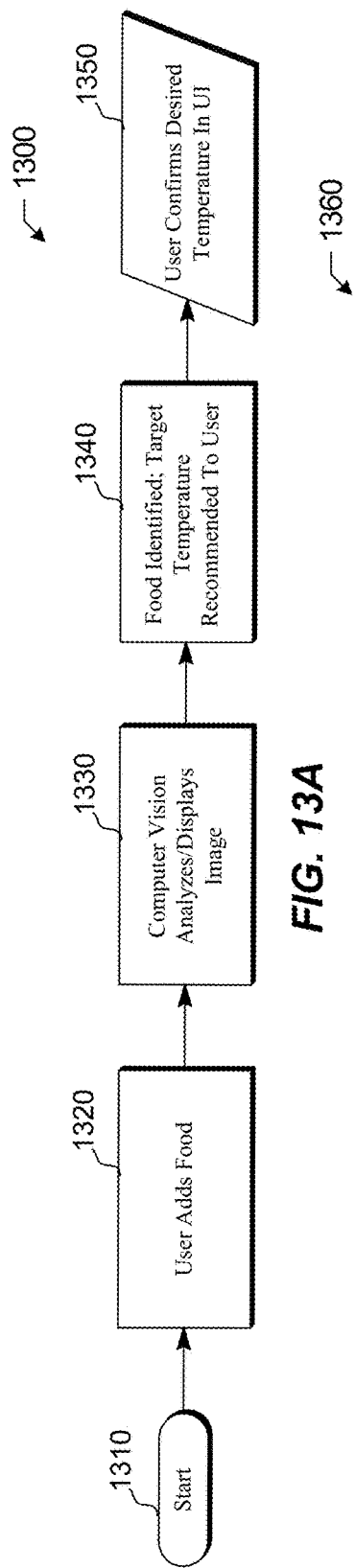
FIGS. 13A and 13B illustrate example diagrams depicting an example workflow and an example user interface of a temperature profile-based cooking appliance.
Figure 13B:
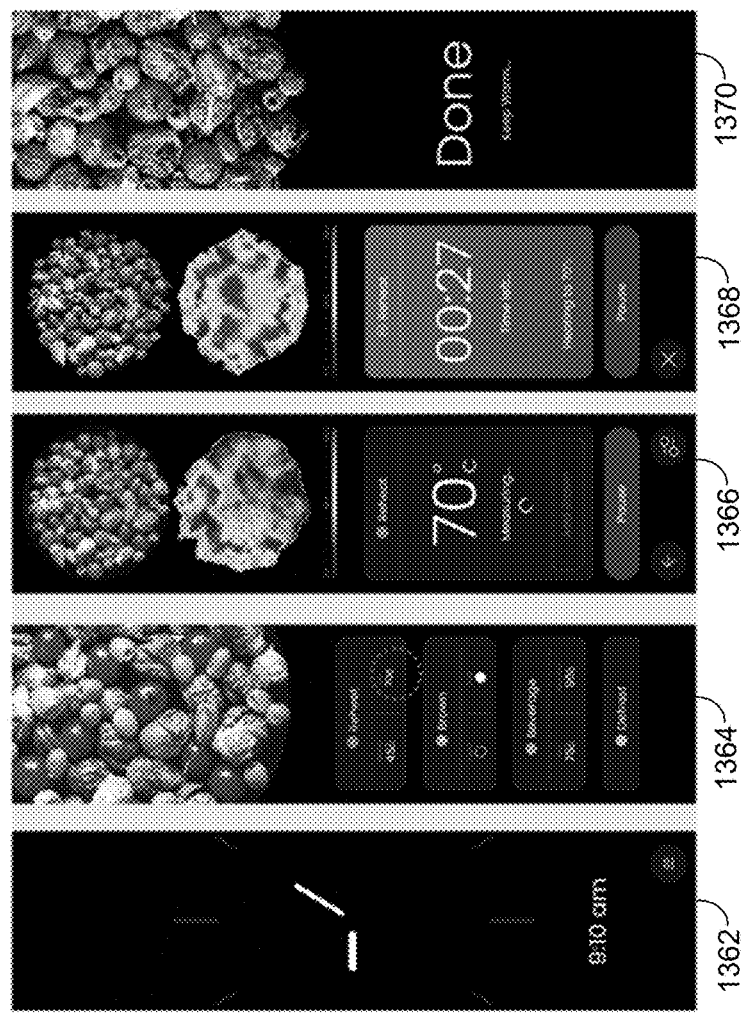

FIGS. 13A-13B illustrate example diagrams 1300 and 1360, depicting an example workflow and an example user interface of a temperature profile-based cooking appliance 102. In particular embodiments, the heating control algorithm may be combined with a user interface (UI) that allows the user to specify the desired temperature profile. As an example and not by way of limitation, the heating control algorithm and UI combination may create an ability to heat food to a user-specified result with minimal input and no need for the user to supervise or intervene during the cooking and/or heating process. For example, the UI may allow a user to define the desired outcome in terms of a temperature of load 510 or other qualitative measure of doneness of load 510, rather than inputting estimates of a power level and heating time. In particular embodiments, cooking appliance 102 may provide a user with real-time information of the temperature profile of one or more loads 510 (e.g., thermal image and/or heat map) as well as quick access to the current measured temperature of the load 510.

In particular embodiments, the workflow of diagram 1300 may begin at step 1310, where a user may add food (e.g., load 510) into a cavity of the electromagnetic device (e.g., cooking appliance 102), at step 1320. In particular embodiments, the electromagnetic device may utilize computer vision to analyze the load 510 and display an image of the load 510 to a user via a user-interface of cooking appliance 102. As an example and not by way of limitation, visible (e.g., RGB) images of load 510 may enable the system of cooking appliance 102 to differentiate between load 510 and a container, which is important for calculation of the heating control algorithm. The images may be displayed to a user on a UI (e.g., touch-enabled display) integrated within cooking appliance 102, allowing a user to visualize the cooking process from the vantage point of an RGB camera. Although this disclosure discloses an RGB camera, this disclosure contemplates any suitable camera and/or optical sensor for imaging load 510.

In particular embodiments, at step 1340, the load 510 may be identified from a database of previously stored images of various loads 510, and display an image (e.g., visible and/or infrared-based thermal images) of the identified load 510 to a user via a UI integrated with cooking appliance 102. In particular embodiments, at step 1340, a target temperature profile of the identified load 510 may be recommended to the user via the UI integrated within cooking appliance 102. As an example and not by way of limitation, a thermal detector, thermal imager, and/or thermal camera may be installed on top of cooking appliance 102, producing a heat map for display by the UI integrated within cooking appliance 102. In particular embodiments, at step 1350, the user may confirm a desired temperature profile via the UI of cooking appliance 102. As an example and not by way of limitation, a temperature-based present may offer the user a "one-click user interaction," providing the user with an option to heat load 510 to their preferred target temperature profile without navigating through several steps in the UI of cooking appliance 102. As an example, one-touch present buttons with a plurality of different temperature options may be displayed via a touch-enabled UI of cooking appliance 102 for user interaction. The desired temperature in step 1350 may become the target temperature profile as in step 720 of FIGS. 7-10.

In particular embodiments, diagram 1360 may display an example user interface (UI) of cooking appliance 102. In particular embodiments, the UI of cooking appliance 102 may include module 1362, displaying a current time for view by a user. In particular embodiments, UI of cooking appliance 102 may include module 1364, displaying an image of the load 510 disposed inside the cavity of cooking appliance 102. As an example and not by way of limitation, module 1364 may include a plurality of selectable cooking options, such as reheat, heat, warm, brown (e.g. lightly brown, darkly brown), beverage warming options (e.g., warm, hot, very hot), defrosting, etc., wherein a user may interact with the plurality of selectable cooking options via a touch-interface of cooking appliance 102. In particular embodiments, the UI of cooking appliance 102 may include module 1366, wherein an image of load 510 may be displayed along with a heat map (e.g., current temperature profile) of load 510. As an example and not by way of limitation, module 1366 may display a current temperature of load 510, where the current temperature may be updated in real-time throughout the heating process. As an example and not by way of limitation, module 1366 may include a selectable option to pause heating. As another example and not by way of limitation, module 1366 may include a selectable option to return to the interface of module 1364.

In particular embodiments, the UI of cooking appliance 102 may include module 1368, wherein an image of load 510 may be displayed along with a heat map (e.g., current temperature profile) of load 510 and an indication of an amount of time left in the heating process. As an example and not by way of limitation, module 1368 may include a selectable option to pause or cancel heating. In particular embodiments, the UI of cooking appliance 102 may include module 1370, where an image of load 510 may be displayed along with an indication that the heating process is complete.

Figure 14:
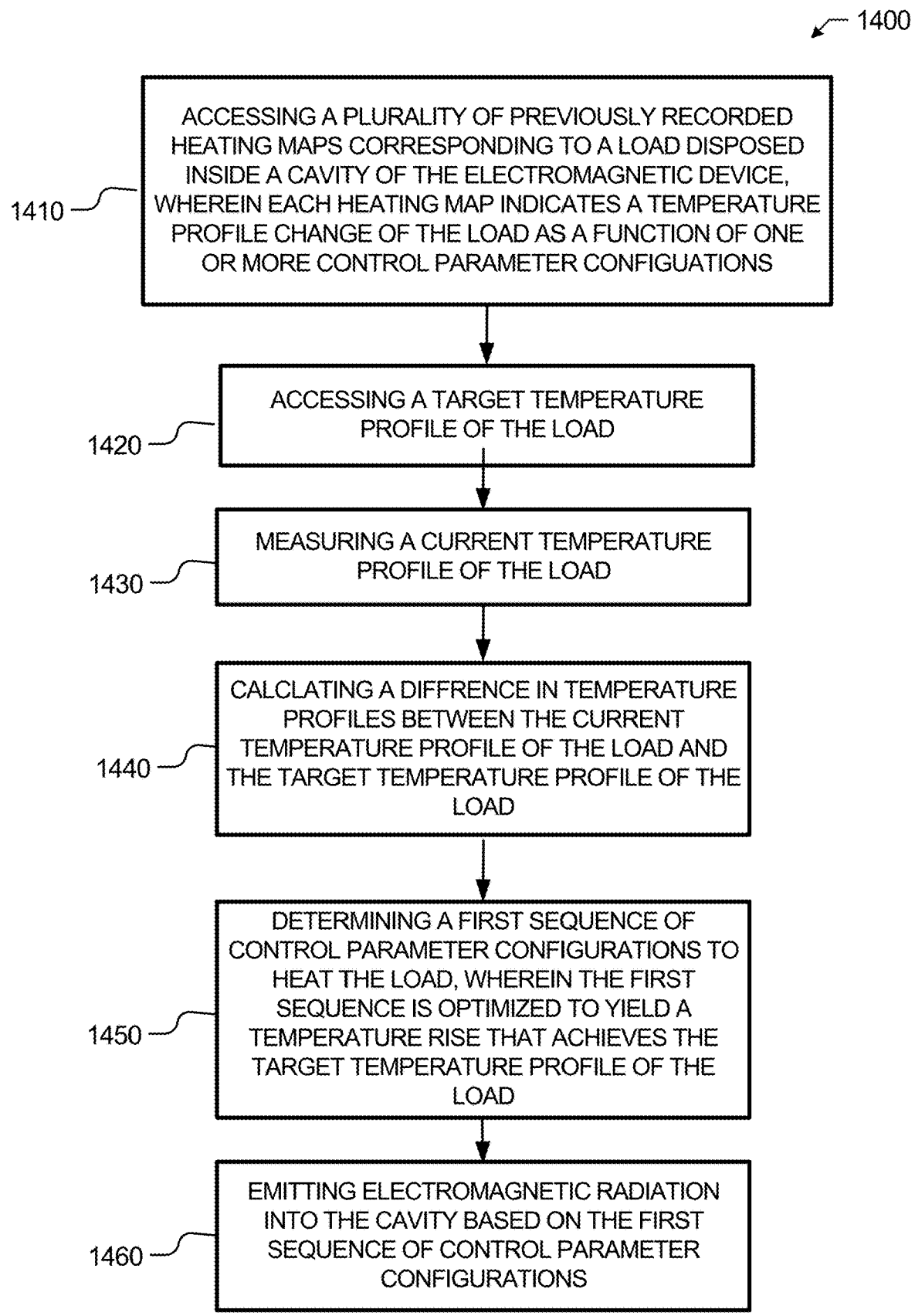
FIG. 14 illustrates a flow diagram of a method for achieving a user-specified temperature profile in a cooking appliance through heating control algorithms.

FIG. 14 illustrates a flow diagram 1400 of a method for achieving a user-specified temperature profile in a cooking appliance 102 through heating control algorithms. The method 1400 may be performed utilizing one or more electromagnetic devices (e.g., cooking appliance 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

In particular embodiments, the method 1400 may begin at block 1410 with the electromagnetic device (e.g., cooking appliance 102) accessing a plurality of previously recorded heating maps corresponding to a load 510 disposed inside a cavity of the electromagnetic device. As an example and not by way of limitation, each heating map may indicate a temperature profile change of the load 510 as a function of one or more control parameter configurations. Cooking appliance 102 may access a plurality of previously recorded heating maps corresponding to a load 510 disposed inside a cavity of the electromagnetic device stored locally in memory 106 of cooking appliance 102 and/or retrieved by network interface 116 from one or more datastores, databases, and/or external storage locations.

In particular embodiments, the method 1400 may continue at block 1430 with the electromagnetic device (e.g., cooking appliance 102) generating a current temperature profile of the load 510 disposed inside the cavity of the electromagnetic device. As an example and not by way of limitation, the electromagnetic device may measure the current temperature of load 510 through the use of detector 540 or any suitable thermal imager to perform prompt spatial thermometry to determine the current temperature profile of the load. In particular embodiments, the method 1400 may continue at step 1440, where the electromagnetic device may calculate a difference in temperature profiles between the current temperature profile of the load 510 (as generated in block 1430) and the target temperature profile of the load 510 (as retrieved in block 1420). As an example and not by way of limitation, the difference in temperature profiles between the current profile of load 510 and the target temperature profile of load 510 may be referred to as a heating gap, wherein the heating gap may be determined by subtracting the current temperature of load 510 from the target temperature profile of load 510.

In particular embodiments, the method 1400 may continue at block 1450, where the electromagnetic device may determine a first sequence of control parameter configurations to heat the load 510. As an example and not by way of limitation, the first sequence of control parameter configurations to heat the load 510 may be based on a non-negative least squares regression to calculate an optimal weight vector t, as disclosed by Equations 11 and 12. In particular embodiments, controller 520 of cooking appliance 102 may construct a sequence of control parameter combinations, wherein each control parameter combination is associated with a corresponding calculated dwell time $t_i$, and wherein the heating control algorithm may sort the resulting sequence of control parameters according to one or more criteria. In particular embodiments, the first sequence of control parameter configurations may contain one or more emission configurations and one or more dwell times between the one or more emission configurations. As an example and not by way of limitation, electromagnetic device may determine an order in which the one or more emission configurations and the one or more dwell times of the first sequence of control parameter configurations are to be applied. As another example and not by way of limitation, the order may be determined according one or more criteria, wherein emitting the electromagnetic radiation is based on the determined order.

In particular embodiments, the method 1400 may continue at block 1460 with the electromagnetic device (e.g., cooking appliance 102) emitting electromagnetic radiation into the cavity of the electromagnetic device based on the first sequence of control parameter configurations. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for mapping heat deposition in a cooking appliance through fast pattern temperature imaging, including the particular steps of the method of FIG. 14, this disclosure contemplates any suitable method for mapping heat deposition, including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Systems and Methods

Figure 15:
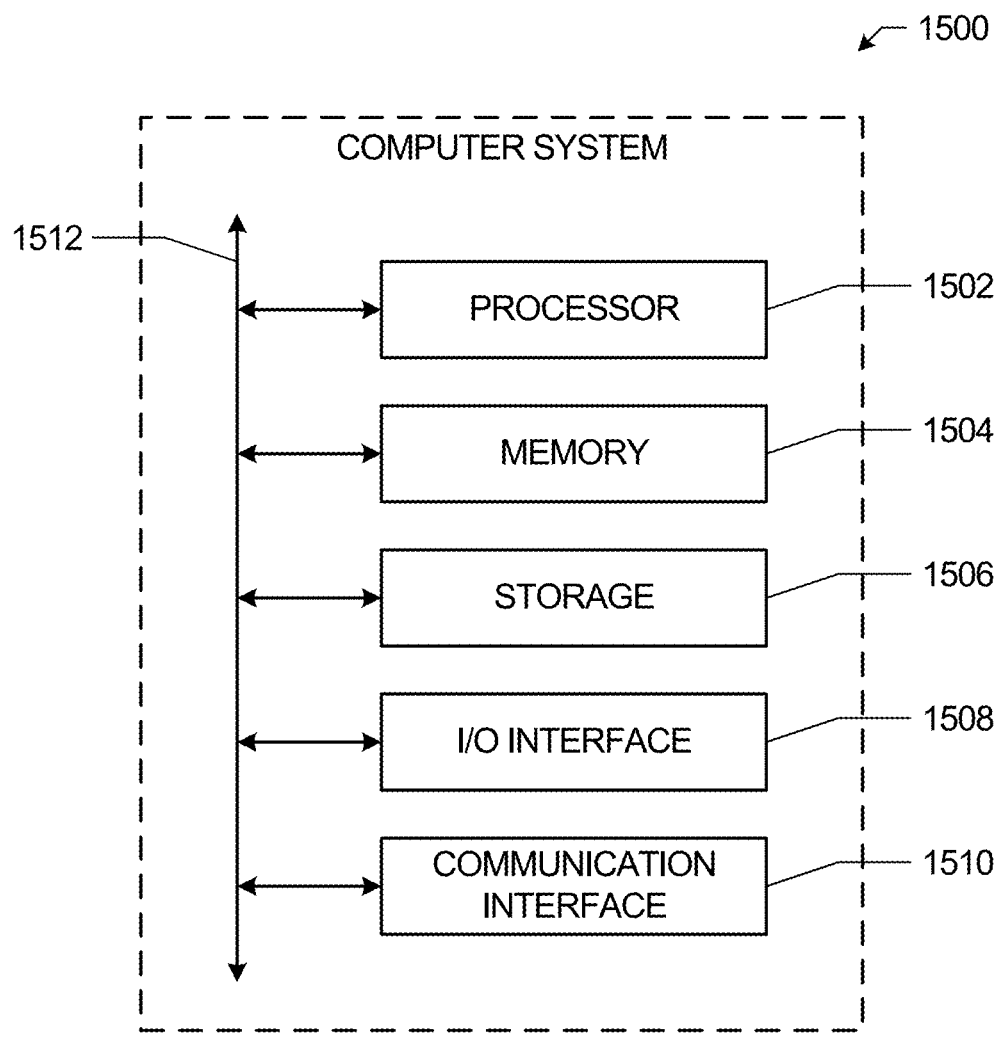
FIG. 15 illustrates an example computer system.

FIG. 15 illustrates an example computer system 1500 that may be utilized to achieve a user-specified temperature profile in a cooking appliance 102 through heating control algorithms, in accordance with the presently disclosed embodiments. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks.

Where appropriate, one or more computer systems 1500 may perform without substantial spatial or temporal limitation one or more steps of one or more methods described or illustrated herein. As an example, and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement. In particular embodiments, processor 1502 includes hardware for executing instructions, such as those making up a computer program. As an example, and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example, and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502.

Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example, and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere).

One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memory devices 1504, where appropriate. Although this disclosure describes and illustrates particular memory, this disclosure contemplates any suitable memory.

In particular embodiments, storage 1506 includes mass storage for data or instructions. As an example, and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506.

Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1506 for them. Where appropriate, I/O interface 1508 may include one or more device or software drivers enabling processor 1502 to drive one or more of these I/O devices. I/O interface 1508 may include one or more I/O interfaces 1506, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it.

As an example, and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example, and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electromagnetic device:
accessing a plurality of previously recorded heating maps corresponding to a load disposed inside a cavity of the electromagnetic device, wherein each heating map indicates a temperature profile change of the load as a function of one or more control parameter configurations;
accessing a target temperature profile of the load;
measuring a current temperature profile of the load;
calculating a difference in temperature profiles between the current temperature profile of the load and the target temperature profile of the load;
determining a first temporal sequence of control parameter configurations to heat the load, wherein the first temporal sequence (1) is optimized to yield a temperature rise that achieves the target temperature profile of the load and (2) comprises a set of control parameter configurations, and for each control parameter configuration, a corresponding time at which to operate the electromagnetic device according to that respective control parameter configuration, wherein:
(1) the temporal sequence of control parameter configurations is determined subject to a constraint that each corresponding time must be non-negative; and
(2) the first temporal sequence of control parameter configurations is determined before heating the load based on the set of control parameter configurations in the sequence; and
emitting electromagnetic radiation into the cavity based on the first temporal sequence of control parameter configurations.

2. The method of claim 1, wherein determining the first temporal sequence of control parameter configurations comprises:
determining one or more emission configurations; and
determining one or more dwell times for which the one or more emission configurations are to be applied.

3. The method of claim 2, further comprising:
determining an order in which the one or more emission configurations and the one or more dwell times of the first temporal sequence of control parameter configurations are to be applied, wherein the order is determined according to one or more criteria, wherein emitting electromagnetic radiation is based on the determined order.

4. The method of claim 2,
wherein each emission configuration comprises a radiation intensity, and wherein the method further comprises:
automatically predicting a total time of the emission of electromagnetic radiation required to yield a temperature rise that achieves the target temperature profile of the load; and
scaling a radiation intensity of the one or more emission configurations to yield a specified heating time.

5. The method of claim 2, further comprising:
in response to emitting electromagnetic radiation into the cavity, determining a second temperature profile of the load; and
calculating, through a non-negative least square regression, the one or more dwell times corresponding to the first temporal sequence of control parameter configurations, wherein the non-negative least square regression yields a minimized squared error between the target temperature profile of the load and the second temperature profile of the load.

6. The method of claim 5, wherein calculating the one or more dwell times corresponding to the first temporal sequence of control parameter configurations further comprises determining an asymmetric cost function to penalize over-heating or under-heating when minimizing the squared error between the target temperature profile of the load and the second temperature profile of the load.

7. The method of claim 4, wherein the radiation intensity is recalculated and the one or more dwell times of the first temporal sequence of control parameter combinations are rescaled to yield a target sum of the one or more dwell times.

8. The method of claim 1, further comprising:
in response to emitting electromagnetic radiation into the cavity, generating an updated current temperature profile of the load;
calculating a difference between the updated current temperature profile of the load and the target temperature profile of the load;
determining a second sequence of control parameter configurations to achieve one or more termination criteria with respect to the load; and
in response to achieving the one or more termination criteria with respect to the load, suspending emission of electromagnetic radiation into the cavity.

9. The method of claim 8, further comprising:
generating an updated set of heating maps; and
storing the updated set of heating maps with the plurality of previously recorded heating maps.

10. The method of claim 1, wherein the control parameter configurations comprise one or more of:
a radiation intensity,
a radiation frequency,
a radiation amplitude,
a radiation phase,
a radiation phase shift,
a load rotation,
a load translation, or
a mode stirrer configuration.

11. An electronic device comprising:
one or more displays;
one or more non-transitory computer-readable storage media including instructions; and
one or more processors coupled to the storage media, the one or more processors configured to execute the instructions to:
access a plurality of previously recorded heating maps corresponding to a load disposed inside a cavity of the electromagnetic device, wherein each heating map indicates a temperature profile change of the load as a function of one or more control parameter configurations;
access a target temperature profile of the load;
measure a current temperature profile of the load;
calculate a difference in temperature profiles between the current temperature profile of the load and the target temperature profile of the load;
determine a first temporal sequence of control parameter configurations to heat the load, wherein the first temporal sequence (1) is optimized to yield a temperature rise that achieves the target temperature profile of the load and (2) comprises a set of control parameter configurations, and for each control parameter configuration, a corresponding time at which to operate the electromagnetic device according to that respective control parameter configuration, wherein;
(1) the temporal sequence of control parameter configurations is determined subject to a constraint that each corresponding time must be non-negative; and
(2) the first temporal sequence of control parameter configurations is determined before heating the load based on the set of control parameter configurations in the sequence; and
emit electromagnetic radiation into the cavity based on the first temporal sequence of control parameter configurations.

12. The electronic device of claim 11, wherein the processors are further configured to execute the instructions to:
determine one or more emission configurations; and
determine one or more dwell times for which the one or more emission configurations are to be applied.

13. The electronic device of claim 12, wherein the processors are further configured to execute the instructions to:
determine an order in which the one or more emission configurations and the one or more dwell times of the first temporal sequence of control parameter configurations are to be applied, wherein the order is determined according to one or more criteria, wherein emitting electromagnetic radiation is based on the determined order.

14. The electronic device of claim 12, wherein each emission configuration comprises a radiation intensity and the processors are further configured to execute the instructions to:
automatically predict a total time of the emission of electromagnetic radiation required to yield a temperature rise that achieves the target temperature profile of the load; and
scale a radiation intensity of the one or more emission configurations to yield a specified heating time.

15. The electronic device of claim 12, wherein the processors are further configured to execute the instructions to:
in response to emitting electromagnetic radiation into the cavity, determine a second temperature profile of the load; and
calculate, through a non-negative least square regression, the one or more dwell times corresponding to the first temporal sequence of control parameter configurations, wherein the non-negative least square regression yields a minimized squared error between the target temperature profile of the load and the second temperature profile of the load.

16. The electronic device of claim 15, wherein calculating the one or more dwell times corresponding to the first temporal sequence of control parameter configurations further comprises instructions to determine an asymmetric cost function to penalize over-heating or under-heating when minimizing the squared error between the target temperature profile of the load and the second temperature profile of the load.

17. The electronic device of claim 14, wherein the radiation intensity is recalculated and the one or more dwell times of the first temporal sequence of control parameter combinations are rescaled to yield a target sum of the one or more dwell times.

18. The electronic device of claim 11, wherein the processors are further configured to execute the instructions to:
in response to emitting electromagnetic radiation into the cavity, generate an updated current temperature profile of the load;
calculate a difference between the updated current temperature profile of the load and the target temperature profile of the load;
determine a second sequence of control parameter configurations to achieve one or more termination criteria with respect to the load; and
in response to achieving the one or more termination criteria with respect to the load, suspend emission of electromagnetic radiation into the cavity.

19. The electronic device of claim 18, wherein the processors are further configured to execute the instructions to:
generate an updated set of heating maps; and
store the updated set of heating maps with the plurality of previously recorded heating maps.

20. The electronic device of claim 11, wherein the control parameter configurations comprise one or more of:
a radiation intensity,
a radiation frequency,
a radiation amplitude,
a radiation phase,
a radiation phase shift,
a load rotation,
a load translation, or
a mode stirrer configuration.

21. A computer-readable non-transitory storage media comprising instructions executable by a processor to:
access a plurality of previously recorded heating maps corresponding to a load disposed inside a cavity of an electromagnetic device, wherein each heating map indicates a temperature profile change of the load as a function of one or more control parameter configurations;
access a target temperature profile of the load;
measure a current temperature profile of the load;
calculate a difference in temperature profiles between the current temperature profile of the load and the target temperature profile of the load;
determine a first temporal sequence of control parameter configurations to heat the load, wherein the first temporal sequence (1) is optimized to yield a temperature rise that achieves the target temperature profile of the load and (2) comprises a set of control parameter configurations, and for each control parameter configuration, a corresponding time at which to operate the electromagnetic device according to that respective control parameter configuration, wherein:
(1) the temporal sequence of control parameter configurations is determined subject to a constraint that each corresponding time must be non-negative; and
(2) the first temporal sequence of control parameter configurations is determined before heating the load based on the set of control parameter configurations in the sequence; and
emit electromagnetic radiation into the cavity based on the first temporal sequence of control parameter configurations.

22. The media of claim 21, wherein the instructions are further executable by the processor to:
determine one or more emission configurations; and
determine one or more dwell times for which the one or more emission configurations are to be applied.

23. The media of claim 22, wherein the instructions are further executable by the processor to:

determine an order in which the one or more emission configurations and the one or more dwell times of the first temporal sequence of control parameter configurations are to be applied, wherein the order is determined according to one or more criteria, wherein emitting electromagnetic radiation is based on the determined order.

24. The media of claim 22, wherein each emission configuration comprises a radiation intensity and the instructions are further executable by the processor to:
automatically predict a total time of the emission of electromagnetic radiation required to yield a temperature rise that achieves the target temperature profile of the load; and
scale a radiation intensity of the one or more emission configurations to yield a specified heating time.

25. The media of claim 22, wherein the instructions are further executable by the processor to:
in response to emitting electromagnetic radiation into the cavity, determine a second temperature profile of the load; and
calculate, through a non-negative least square regression, the one or more dwell times corresponding to the first temporal sequence of control parameter configurations, wherein the non-negative least square regression yields a minimized squared error between the target temperature profile of the load and the second temperature profile of the load.

26. The media of claim 25, wherein the instructions calculating the one or more dwell times corresponding to the first temporal sequence of control parameter configurations are further executable by the processor to determine an asymmetric cost function to penalize over-heating or under-heating when minimizing the squared error between the target temperature profile of the load and the second temperature profile of the load.

27. The media of claim 22, wherein the radiation intensity is recalculated and the one or more dwell times of the first temporal sequence of control parameter combinations are rescaled to yield a target sum of the one or more dwell times.

28. The media of claim 21, wherein the instructions are further executable by the processor to:
in response to emitting electromagnetic radiation into the cavity, generate an updated current temperature profile of the load;
calculate a difference between the updated current temperature profile of the load and the target temperature profile of the load;
determine a second sequence of control parameter configurations to achieve one or more termination criteria with respect to the load; and
in response to achieving the one or more termination criteria with respect to the load, suspend emission of electromagnetic radiation into the cavity.

29. The media of claim 28, wherein the instructions are further executable by the processor to:
generate an updated set of heating maps; and
store the updated set of heating maps with the plurality of previously recorded heating maps.

30. The media of claim 21, wherein the control parameter configurations comprise one or more of:
a radiation intensity,
a radiation frequency,
a radiation amplitude,
a radiation phase,
a radiation phase shift,
a load rotation,
a load translation, or
a mode stirrer configuration.

* * * * *